(12) United States Patent
Takahashi et al.

(10) Patent No.: US 11,275,554 B2
(45) Date of Patent: Mar. 15, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Kei Takahashi, Tokyo (JP); Junichi Shimizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/962,931

(22) PCT Filed: Dec. 17, 2018

(86) PCT No.: PCT/JP2018/046350
§ 371 (c)(1),
(2) Date: Jul. 17, 2020

(87) PCT Pub. No.: WO2019/146309
PCT Pub. Date: Aug. 1, 2019

(65) Prior Publication Data
US 2021/0055910 A1 Feb. 25, 2021

(30) Foreign Application Priority Data
Jan. 26, 2018 (JP) .............................. JP2018-011351

(51) Int. Cl.
*G06F 3/16* (2006.01)
*G06F 3/01* (2006.01)
*G10L 15/24* (2013.01)

(52) U.S. Cl.
CPC .............. *G06F 3/167* (2013.01); *G06F 3/017* (2013.01); *G06F 3/165* (2013.01); *G10L 15/24* (2013.01)

(58) Field of Classification Search
CPC .......... G06F 3/167; G06F 3/017; G06F 3/165; G10L 15/24
See application file for complete search history.

(56) References Cited

U.S. PATENT DOCUMENTS 10,133,544 B2 * 11/2018 Helwani ................... H04S 7/30
10,162,512 B2 * 12/2018 Seo ........................ G06F 1/3231
(Continued)

OTHER PUBLICATIONS

Linda Mechling et al., "Using a Personal Digital Assistant to Increase Completion of Novel Tasks and Independent Transitioning by Students with Autism Spectrum Disorder" J Autism Dev Disord (2011) 41:687-704 (Year: 2010).*
(Continued)

*Primary Examiner* — James T Tsai
(74) *Attorney, Agent, or Firm* — Paratus Law Group, PLLC

(57) ABSTRACT

There is provided an information processing apparatus to provide a technology that allows a user to intuitively select an item when items are audibly presented. The information processing apparatus according to the present technology includes a control section. The control section controls output of voices corresponding to respective items in such a manner that the voices corresponding to the respective items are output to a user alternately from a first direction and a second direction, executes processing related to selection of an item corresponding to a voice output from the first direction in response to a gesture of the user in the first direction, and executes processing related to selection of an item.

21 Claims, 16 Drawing Sheets

(56) References Cited

U.S. PATENT DOCUMENTS

| | | | | |
|---|---|---|---|---|
| 10,306,395 | B1* | 5/2019 | Lyren | H04S 3/008 |
| 2011/0153044 | A1* | 6/2011 | Lindahl | G06F 3/167 |
| | | | | 700/94 |
| 2013/0194109 | A1* | 8/2013 | Clark | G01C 21/26 |
| | | | | 340/905 |
| 2014/0129937 | A1* | 5/2014 | Jarvinen | G06F 3/04847 |
| | | | | 715/716 |
| 2014/0282003 | A1* | 9/2014 | Gruber | G06F 3/165 |
| | | | | 715/727 |
| 2014/0359450 | A1* | 12/2014 | Lehtiniemi | G06F 3/017 |
| | | | | 715/727 |
| 2016/0299526 | A1* | 10/2016 | Inagaki | G06F 3/04883 |
| 2019/0278552 | A1* | 9/2019 | Lyren | G06F 3/04847 |
| 2020/0312282 | A1* | 10/2020 | Akagawa | G06F 3/165 |

OTHER PUBLICATIONS

Christina Dicke, Shaleen Deo, Mark Billinghurst, Nathan Adams, and Juha Lehikoinen. 2008. Experiments in mobile spatial audio-conferencing: key-based and gesture-based interaction. In Proceedings of the 10th international conference on Human computer interaction with mobile devices and services (ACM) (Year: 2008).*

I. J. Pitt and A. D. N. Edwards, "Pointing in an auditory interface for blind users," 1995 IEEE International Conference on Systems, Man and Cybernetics. Intelligent Systems for the 21st Century, 1995, pp. 280-285 vol. 1, doi: 10.1109/ICSMC.1995.537772. (Year: 1995).*

* cited by examiner

In-music-reproduction menu

| | |
|---|---|
| Pause (Do you want to pause it?) | Right |
| Skip to next music track (Do you want to skip to a next music track?) | Left |
| Skip to previous music track (Do you want to skip to a previous music track?) | Right |
| Repeat current music track (Do you want to repeat the current music track?) | Left |
| Bookmark current music track (Do you want to bookmark the current music track?) | Right |
| Play information regarding current music track (Do you want to listen to information regarding the current music track?) | Left |

In-news-reproduction menu

| | |
|---|---|
| Pause (Do you want to pause it?) | Right |
| Skip to next news topic (Do you want to skip to a next music track?) | Left |
| Skip to previous news topic (Do you want to skip to a previous news topic?) | Right |
| Bookmark current news topic (Do you want to bookmark the current news topic?) | Left |

FIG.10

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/046350 (filed on Dec. 17, 2018) under 35 U.S.C. § 371, which claims priority to Japanese Patent Application No. 2018-011351 (filed on Jan. 26, 2018), which are all hereby incorporated by reference in their entirety.

TECHNICAL FIELD

The present technology relates to a technology regarding an information processing apparatus or the like capable of selecting an item in a menu.

BACKGROUND ART

In general, when a user selects an item in a menu by using various kinds of apparatuses such as a PC or a smartphone, the user selects the item by using a mouse to designate the item in the menu displayed on a screen or by touching the item with a finger.

However, in a specific situation, sometimes it is disadvantageous to visually present items in the menu and designate an item with the mouse or the finger as described above. For example, it is assumed that the user is walking or running while listening to music with headphones that are connected to the smartphone or the like. In such a case, safety is compromised when the user looks at the menu on the screen and performs operation by touching an item in the menu with a finger to select a music track or control operation (pause, play, or the like) with regard to the music track. In addition, in the case where the apparatus does not include the screen, it is impossible to visually present the items in the menu.

Patent Literature 1 listed below discloses a technology that adopts audible presentation of items in a menu instead of visual presentation of the items in the menu.

CITATION LIST

Patent Literature

Patent Literature 1: JP 2015-506035T

DISCLOSURE OF INVENTION

Technical Problem

With regard to the audible presentation of items in a menu, a technology has been desired which allows a user to intuitively select an item.

In view of the circumstances as described above, a purpose of the present technology is to provide the technology that allows a user to intuitively select an item when items are audibly presented.

Solution to Problem

An information processing apparatus according to the present technology includes a control section. The control section controls output of voices corresponding to respective items in such a manner that the voices corresponding to the respective items are output to a user alternately from a first direction and a second direction, executes processing related to selection of an item corresponding to a voice output from the first direction in response to a gesture of the user in the first direction, and executes processing related to selection of an item corresponding to a voice output from the second direction in response to a gesture of the user in the second direction.

The information processing apparatus controls output of voices corresponding to respective items in such a manner that the voices corresponding to the respective items are output to the user alternately from the first direction and the second direction. In other words, the items are audibly presented to the user in such a manner that the respective items are separated by directions and time. It is possible to appropriately present the items to the user when the items are presented to the user in such a manner that the respective items are separated by the directions and time as described above.

In addition, the information processing apparatus executes the processing related to selection of an item corresponding to a voice output from the first direction in accordance with a gesture of the user in the first direction, and executes the processing related to selection of an item corresponding to a voice output from the second direction in accordance with a gesture of the user in the second direction. This allows the user to intuitively select the item corresponding to the voice.

In the information processing apparatus, the control section may set a gesture reception period of receiving a gesture of the user, for each of the items corresponding to the voices.

In the information processing apparatus, as the gesture reception periods, the control section may set a first gesture reception period of selecting the item corresponding to the voice output from the first direction and a second gesture reception period of selecting the item corresponding to the voice output from the second direction.

In the information processing apparatus, the first gesture reception period may be a period from start of output of the voice from the first direction to start of output of a next voice from the first direction.

In the information processing apparatus, the second gesture reception period may be a period from start of output of the voice from the second direction to start of output of a next voice from the second direction.

In the information processing apparatus, the gesture reception period may include at least a voice output period that is a period from start to stop of output of the voice.

In the information processing apparatus, the control section may adjust length of the voice output period in such a manner that the gesture reception periods regarding the respective items corresponding to the voices have constant lengths.

In the information processing apparatus, the control section may adjust the length of the voice output period in such a manner that the length of the sound output period falls within a predetermined range.

In the information processing apparatus, the control section may change text data serving as a source of the voice in the case where the length of the voice output period does not fall within the predetermined range.

In the information processing apparatus, the control section may change reproduction speed of the voice in the case where the length of the voice output period does not fall within the predetermined range.

In the information processing apparatus, the control section may control length of the gesture reception period in such a manner that the gesture reception period has a variable length.

In the information processing apparatus, the control section may control the length of the gesture reception period in such a manner that the gesture reception period has a variable length in accordance with behavior of the user.

In the information processing apparatus, the gesture reception period may include at least a voice output period that is a period from start to stop of output of the voice and an extension period added after the voice output period. The control section may control length of the extension period in such a manner that the extension period has a variable length, and thereby controls the length of the gesture reception period in such a manner that the gesture reception period has a variable length.

In the information processing apparatus, the control section may control the first direction and the second direction in such a manner that the first direction and the second direction are variable.

In the information processing apparatus, the control section may control the first direction and the second direction in such a manner that the first direction and the second direction are variable in accordance with an orientation of the user.

In the information processing apparatus, the item may be an item in a menu, the menu may include multiple menus in the different layers, and the control section may control the first direction and the second direction in such a manner that the first direction and the second direction are variable in accordance with the layers of the menus.

In the information processing apparatus, the information processing apparatus may include an apparatus worn in or on an ear of the user.

In the information processing apparatus, the first direction may be a right direction, the second direction may be a left direction, the gesture of the user in the first direction may be a user gesture of turning to the right direction, and the gesture of the user in the second direction may be a user gesture of turning to the left direction.

An information processing method according to the present technology includes:

controlling output of voices corresponding to respective items in such a manner that the voices corresponding to the respective items are output to a user alternately from a first direction and a second direction;

executing processing related to selection of an item corresponding to a voice output from the first direction in response to a gesture of the user in the first direction; and executing processing related to selection of an item corresponding to a voice output from the second direction in response to a gesture of the user in the second direction.

A program according to the present technology causes a computer to function as a control section that:

controls output of voices corresponding to respective items in such a manner that the voices corresponding to the respective items are output to a user alternately from a first direction and a second direction;

executes processing related to selection of an item corresponding to a voice output from the first direction in response to a gesture of the user in the first direction; and executes processing related to selection of an item corresponding to a voice output from the second direction in response to a gesture of the user in the second direction.

As described above, according to the present technology, it is possible to provide the technology regarding the information processing apparatus or the like that allows a user to intuitively select an item when items are audibly presented.

BRIEF DESCRIPTION OF DRAWINGS

FIG. 10 is a diagram illustrating an example of menus called when music reproduction processing, news reproduction processing, and the like have already been executed.

MODE(S) FOR CARRYING OUT THE INVENTION

Hereinafter, embodiments of the present technology will be described with reference to the drawings.

First Embodiment

<Entire Configuration and Configurations of Respective Structural Elements>>

Figure 1:
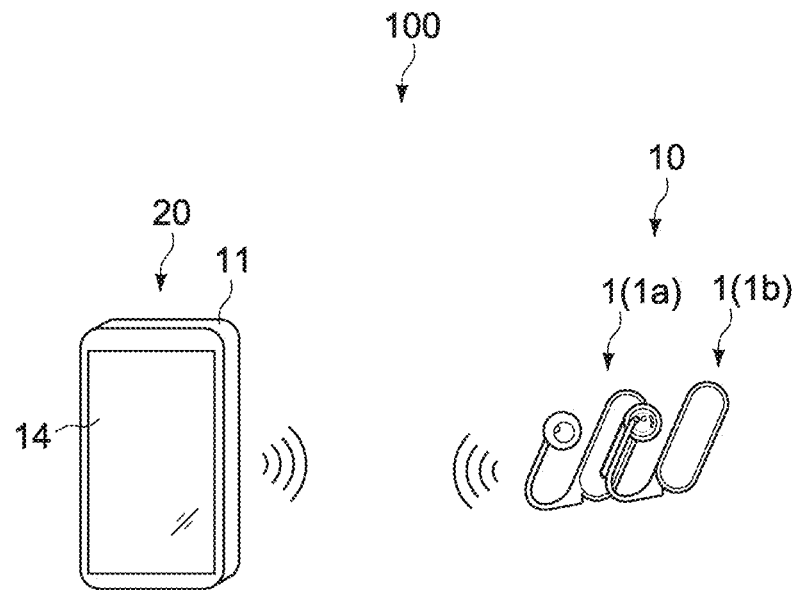
FIG. 1 is a diagram illustrating an information processing apparatus according to a first embodiment.

FIG. 1 is a diagram illustrating an information processing apparatus 100 according to a first embodiment of the present technology. As illustrated in FIG. 1, the information processing apparatus 100 includes a smartphone 20 and headphones 20 capable of wirelessly communicating with the smartphone 20.

Figure 2:
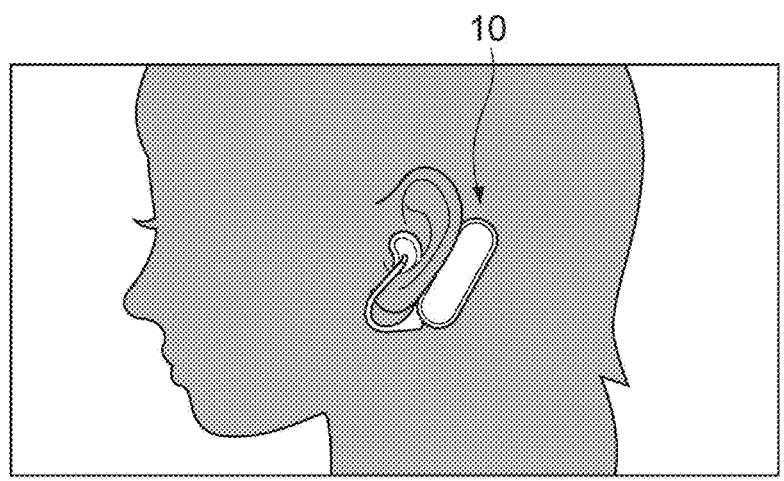
FIG. 2 is a diagram illustrating a situation where headphones are worn in ears of a user.
Figure 3:
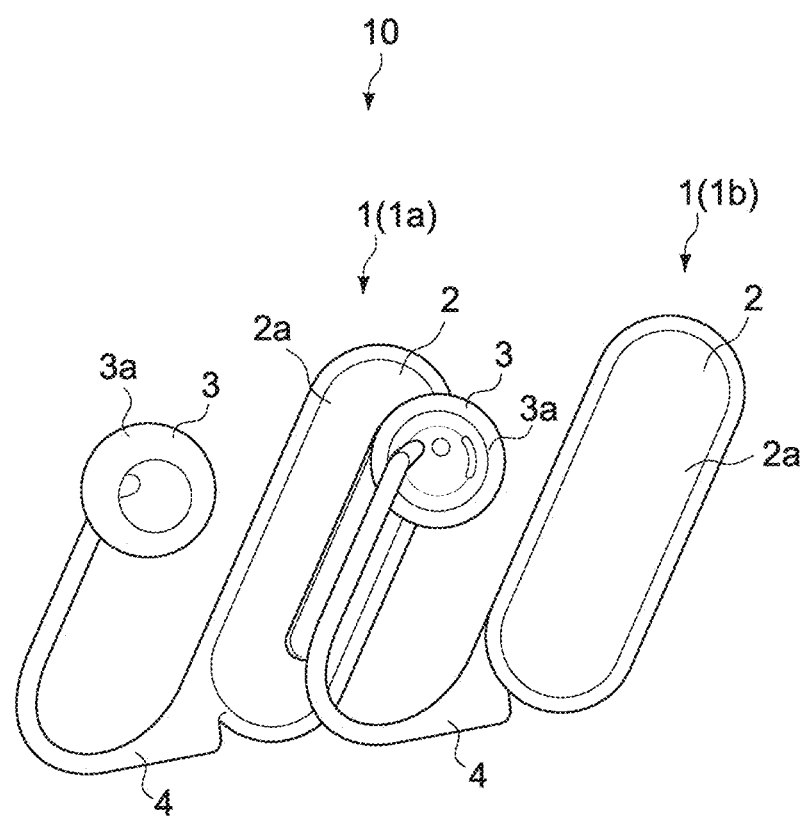
FIG. 3 is an enlarged view of the headphones.

FIG. 2 is a diagram illustrating a situation where the headphones 10 are worn in ears of a user. FIG. 3 is an enlarged view of the headphones 10.

The headphones 10 include a first headphone unit 1a to be worn in a right ear and a second headphone unit 1b to be worn in a left ear. The first headphone unit 1a and the second headphone unit 1b are configured to be separate from each other and be capable of wirelessly communicating with each other. According to the present embodiment, the first headphone unit 1a is a master terminal, and the second headphone unit 1b is a slave terminal.

The first headphone unit 1a and the second headphone unit 1b are configured to be bilaterally symmetrical to each other, and they have basically the same configuration. Note that, hereinafter, in the case of distinguishing the two headphone units 1, the two headphone units 1 are referred to as the first headphone unit 1a and the second headphone unit 1b. When there is no need to distinguish them, they are simply referred to as the headphone units 1.

The headphone unit 1 includes a unit main body 2, a speaker section 3, and a U-shaped connection section 4 that connects the unit main body 2 to the speaker section 3.

The unit main body 2 includes a thin casing 2a. The casing 2a stores various kinds of electronic components (such as a control section 4a or 4b and a motion sensor 7a or 7b to be described later) therein. The speaker section 3 includes a speaker 6a or 6b (see FIG. 4) capable of outputting sound, and the speaker section 3 includes an eartip 3a. The eartip 3a is configured to be insertable into an ear canal of the user.

When the headphone unit 1 is worn in an ear of the user, the unit main body 2 is positioned behind the ear of the user, the speaker section 3 is positioned in an earhole of the user, and the connection section 4 is positioned below the ear.

The shape of the connection section 4 makes it difficult for the headphone unit 1 to fall from the ear of the user even when the user does exercise once the headphone unit 1 is worn in the ear.

Figure 4:
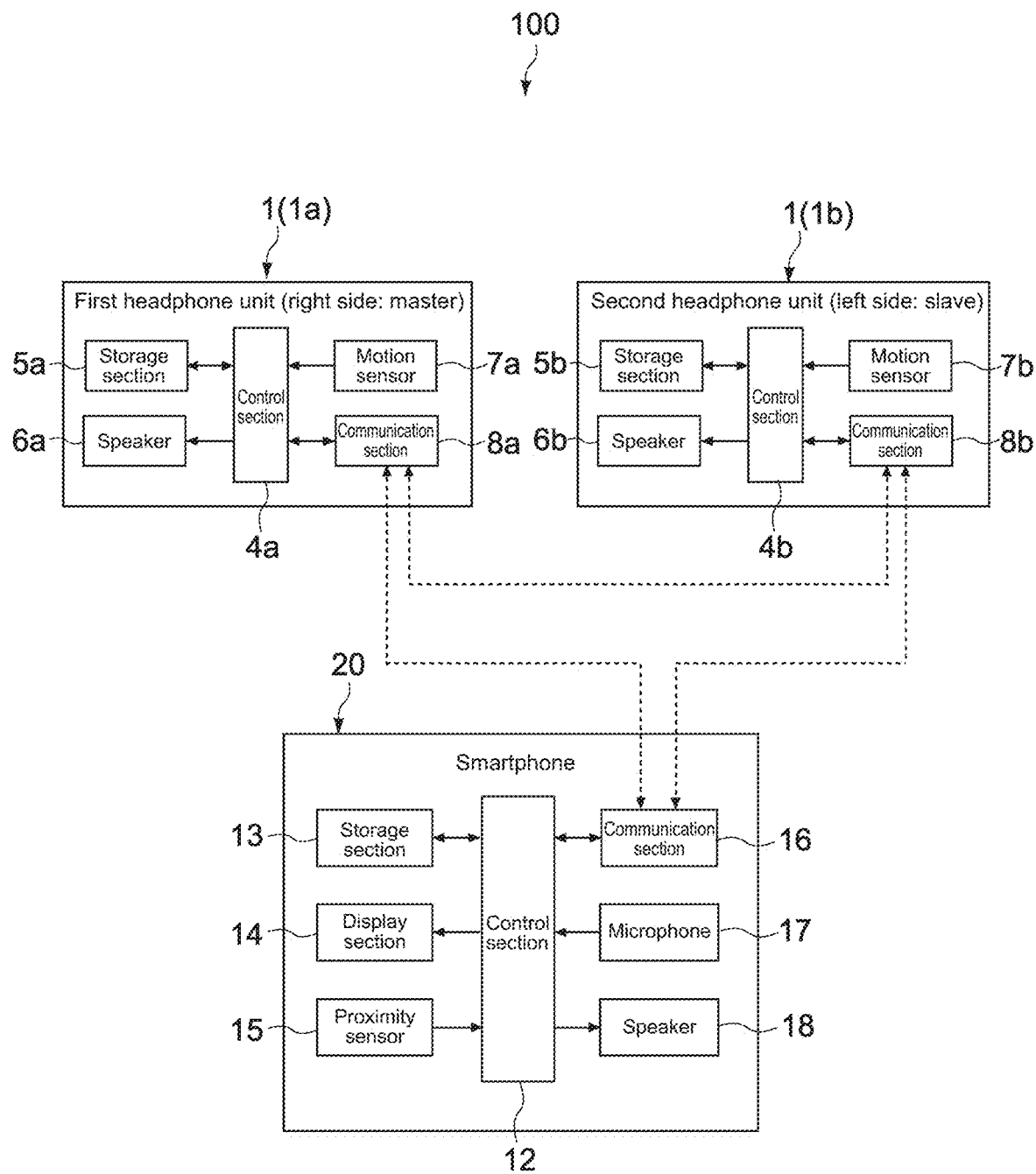
FIG. 4 is a block diagram illustrating an electrical configuration of the information processing apparatus.

FIG. 4 is a block diagram illustrating an electrical configuration of the information processing apparatus 100.

The first headphone unit 1a and the second headphone unit 1b respectively include control sections 4a and 4b, storage sections 5a and 5b, speakers 6a and 6b, motion sensors 7a and 7b, and communication section 8a and 8b.

Each of the control sections 4a and 4b includes a central processing unit (CPU) or the like, for example, and integrally controls respective sections of the headphone unit 1a or 1b.

Each of the storage sections 5a and 5b includes non-volatile memory that fixedly stores various kinds of data and programs necessary for processing performed by the control section 4a or 4b, and volatile memory used as a workspace of the control section 4a or 4b. The programs may be read out from a portable recording medium such as an optical disc or a semiconductor memory, or may be downloaded from a server apparatus on a network.

Each of the speakers 6a and 6b outputs sound on the basis of a sound signal output from the control section 4a or 4b. Each of the motion sensors 7a and 7b is configured to be capable of detecting behavior of the user. For example, each of the motion sensors 7a and 7b includes at least one of an acceleration sensor, an angular velocity sensor, an angular sensor (geomagnetic sensor), or a combination of two or more sensors selected from the above.

Each of the motion sensors 7a and 7b typically has detection axes in three axial directions perpendicular to each other (acceleration in triaxial directions, angular velocities about three axes, angles about three axes), but each of the motion sensors 7a and 7b may have a detection axis in one axial direction, detection axes in two axial directions, or the like.

The communication section 8a of the first headphone unit 1a and the communication section 8b of the second headphone unit 1b are configured to be capable of wireless communication with each other.

In addition, the communication section 8a of the first headphone unit 1a and the communication section 8b of the second headphone unit 1b are configured to be capable of wireless communication with a communication section 16 of the smartphone 20.

With reference to FIG. 1 and FIG. 4, the smartphone 20 includes a casing 11, a control section 12, a storage section 13, a display section 14, a proximity sensor 15, the communication section 16, a microphone 17, and the speaker 18.

The casing 11 has a thin cuboid shape, and the user is capable of carrying the casing 11. The control section 12 includes a CPU or the like, for example, and integrally controls respective sections of the smartphone 20.

The storage section 13 includes non-volatile memory that fixedly stores various kinds of data and programs necessary for processing performed by the control section 12, and volatile memory used as a workspace of the control section 12. The programs may be read out from a portable recording medium such as an optical disc or a semiconductor memory, or may be downloaded from a server apparatus on a network.

The display section 14 is provided on a front surface of the casing 11. Under the control of the control section, the display section 14 displays various kinds of images on a screen.

The proximity sensor 15 is provided on the display section 14. The proximity sensor 15 detects proximity of a finger of the user to the display section 14, and outputs, to the control unit 12, a signal indicating the proximity of the finger of the user and a signal indicating a finger proximity position.

The communication section 16 is configured to be capable of mutual wireless communication with the communication section 8a of the first headphone unit 1a and the communication section 8b of the second headphone unit 1b. In addition, the communication section 16 is configured to be capable of communication with another phone, a server apparatus on a network, and the like.

The microphone 17 converts voice of the user on the phone into an electric signal and outputs the signal to the control section 12. The speaker 18 outputs voice of a person on the other end of the line or the like under the control of the control section 12.

<Basic Method>

Figure 5:
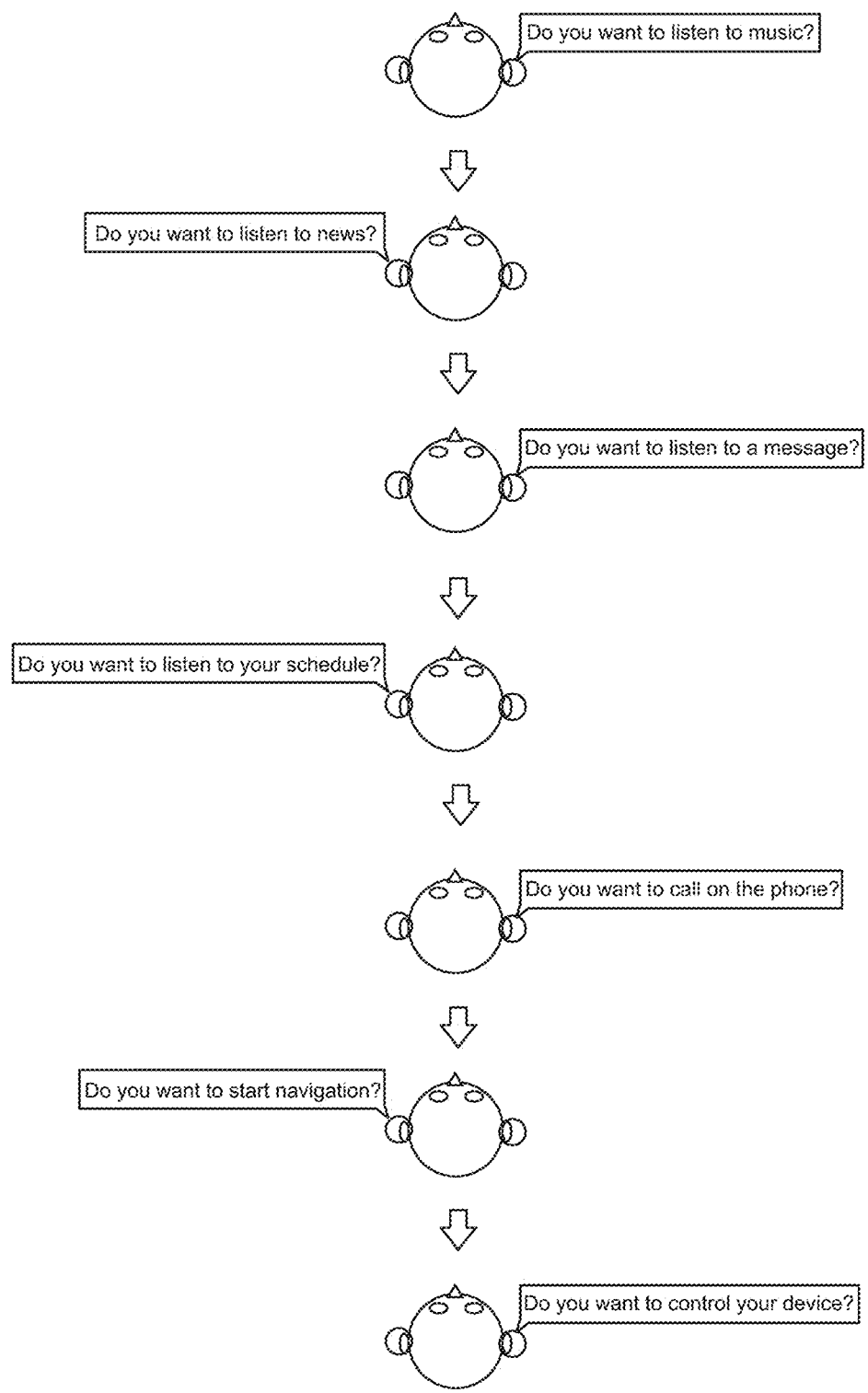
FIG. 5 is a diagram illustrating a situation where items in a menu are presented to the user by voice.

Next, a basic method of selecting an item in a menu according to the present embodiment will be described. FIG. 5 is a diagram illustrating a situation where items in a menu are presented to the user by voice.

In the example illustrated in FIG. 5, seven questions are prepared as voices corresponding to the respective items in the menu. The seven questions are: "do you want to listen to music?"; "do you want to listen to news?"; "do you want to listen to a message?"; "do you want to listen to your schedule?"; "do you want to call on the phone?"; "do you want to start navigation?"; and "do you want to control your device?".

Next, the voices corresponding to the respective items in the menu are output alternately from the right direction and the left direction with regard to the respective items. Note that, a sound effect (such as "pong" or "ping") indicating change of the item may be interposed between the voices corresponding to the respective items.

When the user makes a gesture of turning right (item selection gesture) in response to the voice output from the right direction, the item corresponding to the voice output from the right direction is selected. On the other hand, when the user makes a gesture of turning left (item selection gesture) in response to the voice output from the left direction, the item corresponding to the voice output from the left direction is selected.

Figure 6:
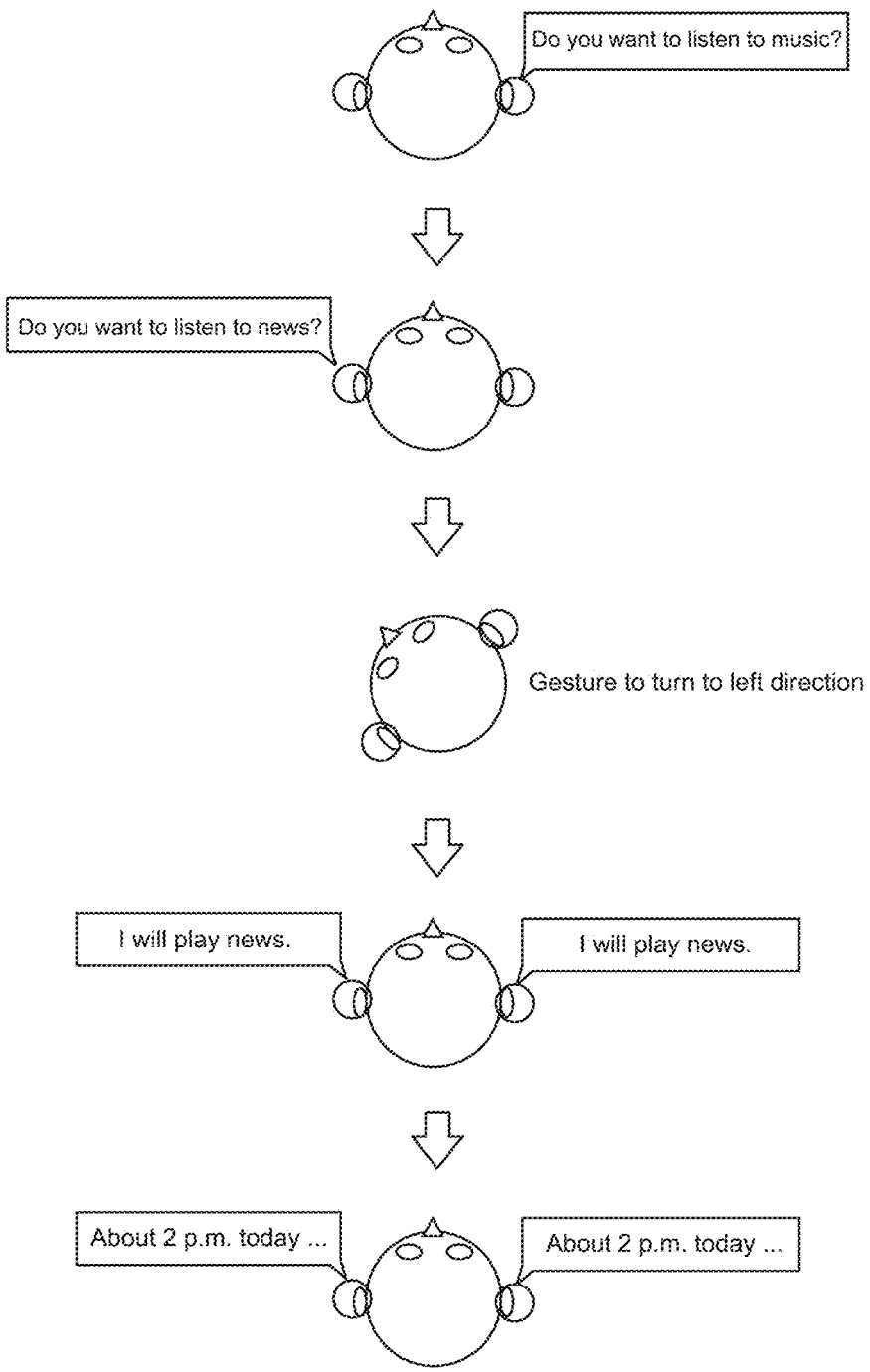
FIG. 6 is a diagram illustrating a situation where the user makes a gesture in response to a voice.

FIG. 6 is a diagram illustrating a situation where the user makes a gesture in response to a voice. In the example illustrated in FIG. 6, a voice saying "do you want to listen to news?" is output from the left direction, and then the user makes a gesture of turning left in response to the voice.

In this case, an item related to the "news" is selected. For example, a voice saying "I will play news" is output (from both the left and right directions), and then a voice reading out content of the news is output (from both the left and right directions).

Here, a gesture reception period T of receiving a gesture of the user is set for each of items corresponding to voices. In particular, according to the present embodiment, a first gesture reception period T of selecting items corresponding to voices output from the right direction and a second gesture reception period T of selecting items corresponding to voices output from the left direction are set as the gesture reception periods T.

Figure 7:
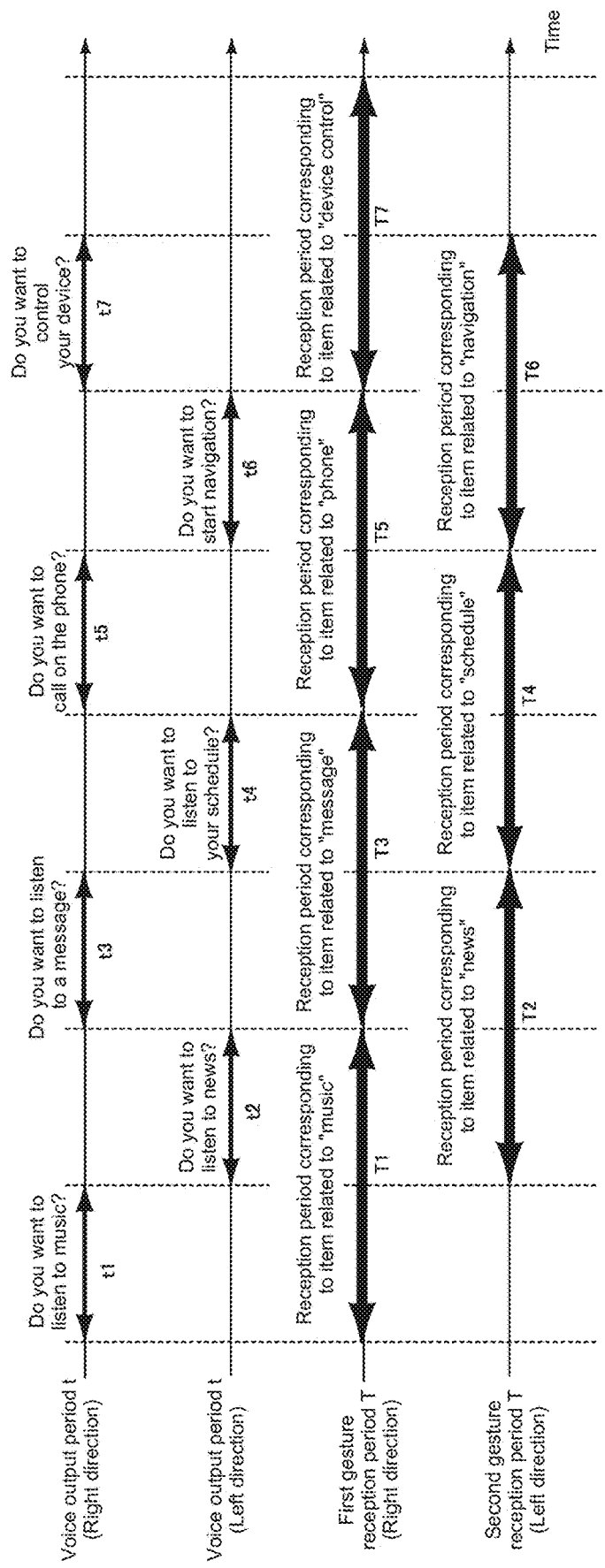
FIG. 7 is a diagram illustrating a relationship between voice output periods and gesture reception periods.

FIG. 7 is a diagram illustrating a relationship between voice output periods t and the gesture reception periods T (the voice output period t is a period from start to stop of output of a voice corresponding to an item).

As illustrated in FIG. 7, the gesture reception period T includes at least the voice output period t of a corresponding item. In particular, according to the present embodiment, the first gesture reception period T is a period from start of output of a voice corresponding to an item from the right direction to start of output of a next voice from the right direction. In addition, the second gesture reception period T is a period from start of output of a voice corresponding to an item from the left direction to start of output of a next voice from the left direction.

For example, a gesture reception period T1 corresponding to an item related to "music" (first gesture reception period T) is a period from start of output of a voice saying "do you want to listen to music?" from the right direction to start of output of a next voice saying "do you want to listen to a message?" from the right direction.

In addition, for example, a gesture reception period T2 corresponding to an item related to "news" (second gesture reception period T) is a period from start of output of a voice saying "do you want to listen to news?" from the left direction to start of output of a next voice saying "do you want to listen to your schedule?" from the left direction.

Here, as an example, it is assumed that the user makes a gesture of turning left during the period from start of output of the voice saying "do you want to listen to news?" from the left direction to start of output of the next voice saying "do you want to listen to your schedule?" from the left direction, for example. In this case, the item related to "news" is selected even while the voice saying "do you want to listen to messages?" is being output from the right direction.

<Various Kinds of Examples of Menu>

Figure 8:
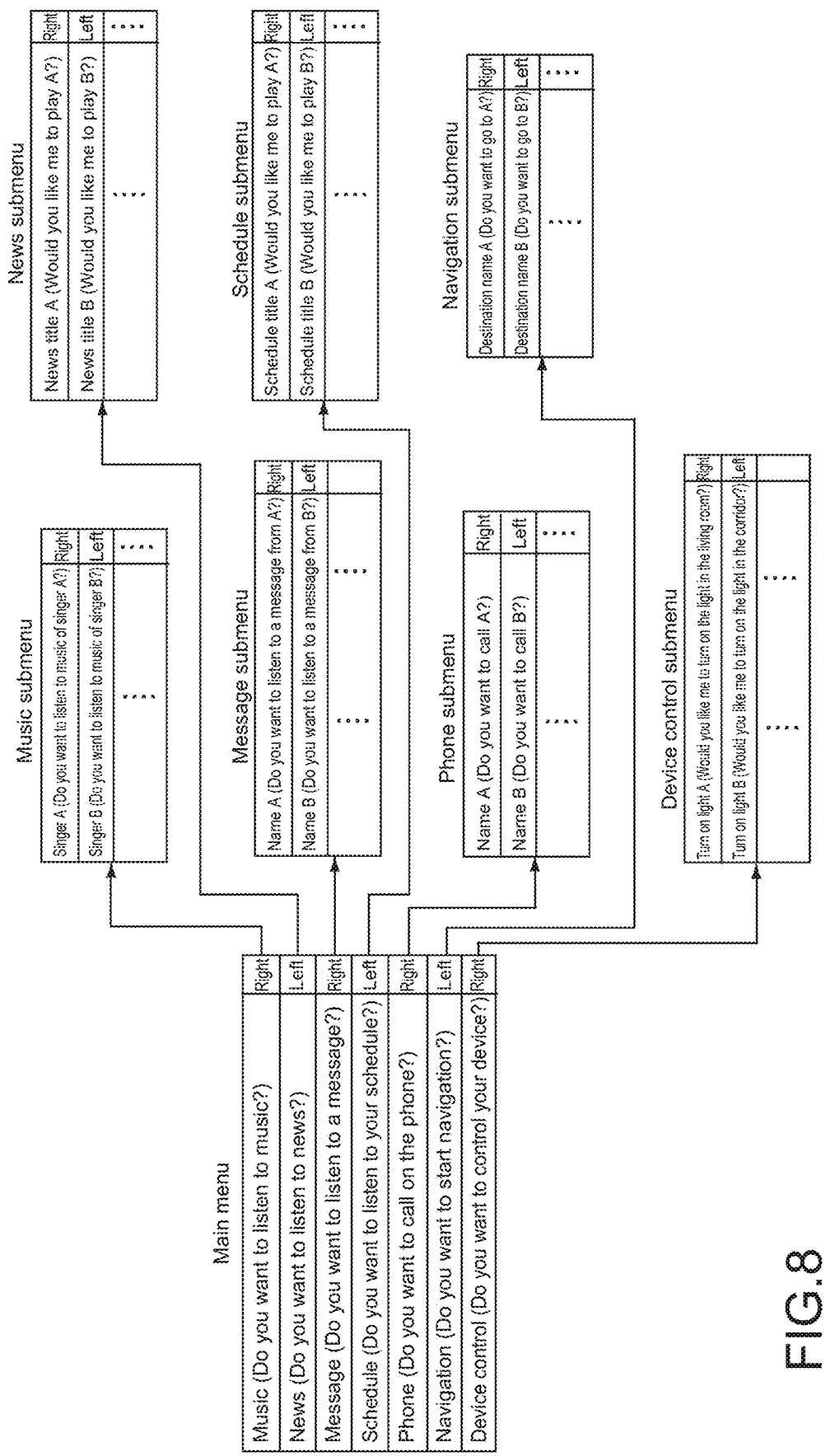
FIG. 8 is a diagram illustrating an example of menus.

Next, various kinds of examples of menu will be described. FIG. 8 is a diagram illustrating an example of menus. The example illustrated in FIG. 8 includes a main menu and submenus that are called when respective items in the main menu are selected.

As illustrated in FIG. 8, each menu includes multiple items. In FIG. 8, a sentence in parentheses on the right side of each item represents a voice corresponding to each item. A word in a right box of each item represents a direction from which a voice is output to the user ("right" or "left").

Note that, the voices corresponding to the items are output in the order from top to bottom.

The main menu includes seven items related to "music", "news", "message", "schedule", "phone", "navigation", and "device control". In addition, seven questions are prepared as voices corresponding to these items. The seven questions are: "do you want to listen to music?"; "do you want to listen to news?"; "do you want to listen to a message?"; "do you want to listen to your schedule?"; "do you want to call on the phone?"; "do you want to start navigation?"; and "do you want to control your device?".

When the user selects a specific item in the main menu (when the user makes a right gesture or a left gesture during a gesture reception period related to the specific item), a submenu corresponding to the item is called. The order of the items in the main menu may be rearranged in such a manner that an item having a high frequency of selection is output first (with regard to rearrangement of the order, the same applies to various kinds of menus to be described later).

The submenu related to "music" includes items corresponding to respective singers such as "singer A" and "singer B". In addition, a voice saying "do you want to listen to music of singer A?", a voice saying "do you want to listen to music of singer B?", and the like are prepared as voices corresponding to the items.

When the user selects a specific singer in the music submenu, music of the selected singer is reproduced.

The news submenu includes items corresponding to respective news topics such as a "news title A" and a "news title B". In addition, a voice saying "do you want to listen to A?", a voice saying "do you want to listen to B?", and the like are prepared as voices corresponding to the items.

When the user selects a specific news topic in the news submenu, content of the selected news topic is reproduced.

The message submenu includes items corresponding to respective message senders such as "name A" and "name B". In addition, a voice saying "do you want to listen to a message from A?", a voice saying "do you want to listen to a message from B?", and the like are prepared as voices corresponding to the items.

When the user selects a specific sender in the message submenu, content of the message from the selected sender is reproduced.

Note that, the messages are emails, messages received via a social network service (SNS), and the like. Basically, a message to be reproduced is a newly arriving message that the user has not read (listened to) yet.

The schedule submenu includes items corresponding to respective schedules such as "schedule title A" and "schedule title B". In addition, a voice saying "would you like me to play A?", a voice saying "would you like me to play B?", and the like are prepared as voices corresponding to the items.

When the user selects a specific schedule in the schedule submenu, detailed content of the selected schedule (such as place and time) is reproduced.

The phone submenu includes items corresponding to respective callees such as "name A" and "name B". In addition, a voice saying "do you want to call A?", a voice saying "do you want to call B?", and the like are prepared as voices corresponding to the items.

When the user selects a specific callee in the phone submenu, a phone call is made to the selected callee.

Note that, callees registered on a phone directory are used as the items such as "name A" and "name B" in the phone submenu, for example.

The navigation submenu includes items corresponding to destinations such as "destination name A" and "destination name B". In addition, a voice saying "do you want to go to A?", a voice saying "do you want to go to B?", and the like are prepared as voices corresponding to the items.

When the user selects a specific item in the navigation submenu, navigation to the selected destination starts.

Note that, destination names that have been previously registered by the user are used as the items such as "destination name A" and "destination name B" in the navigation submenu.

The device control submenu includes items corresponding to respective control targets and respective control operations such as "turn on the light A" and "turn on the light B". In addition, a voice saying "would you like me to turn on the light in the living room?", a voice saying "would you like me to turn on the light in the corridor?", and the like are prepared as voices corresponding to the items.

When the user selects a specific item in the device control submenu, the selected device is controlled.

Note that, for example, the user previously registers the items in the device control submenu such as "turn on the light A" and "turn on the light B".

[Number of Layers]

Figure 9:
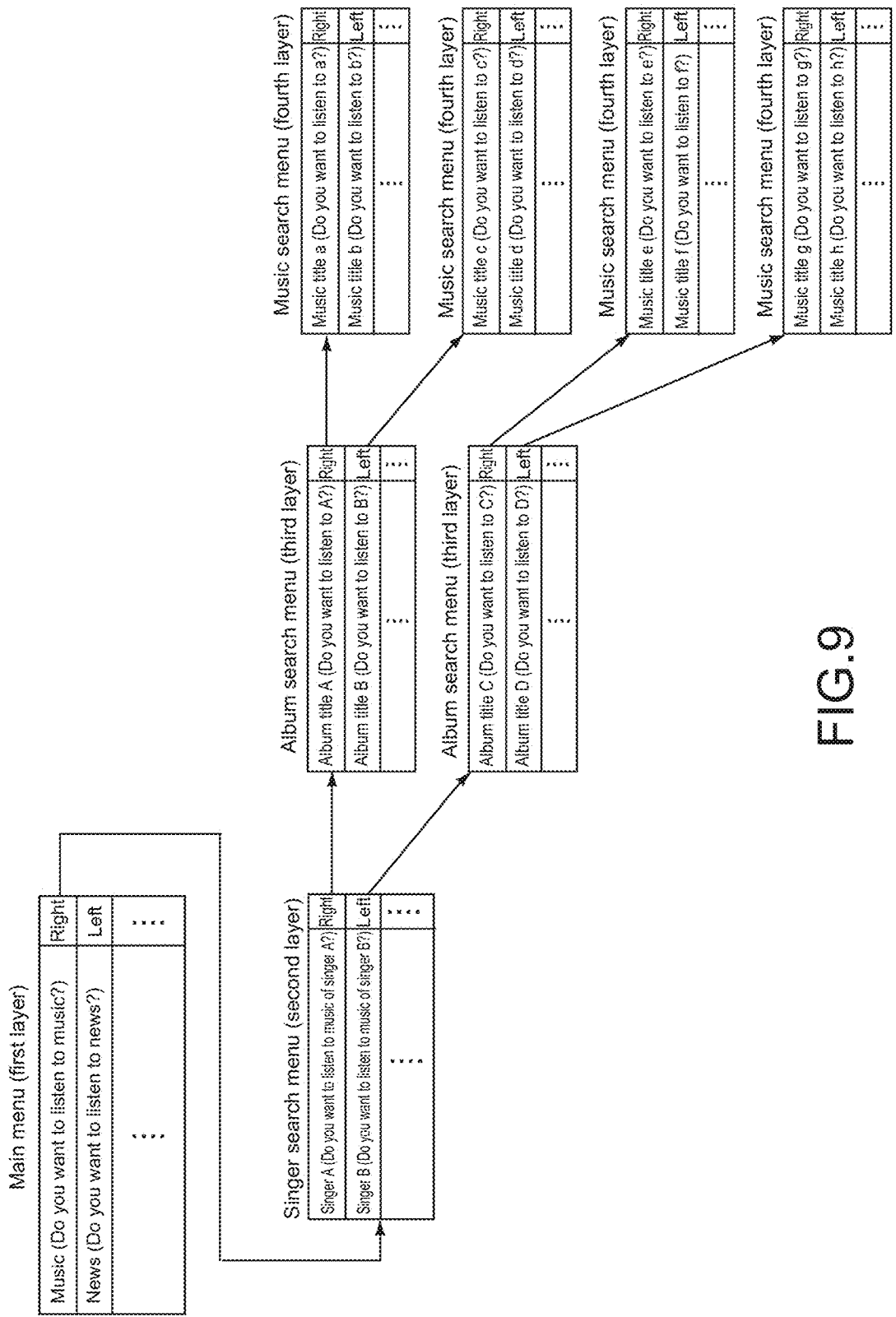
FIG. 9 is a diagram illustrating an example of a case where the number of layers of menus is three or more.
Figure 11:
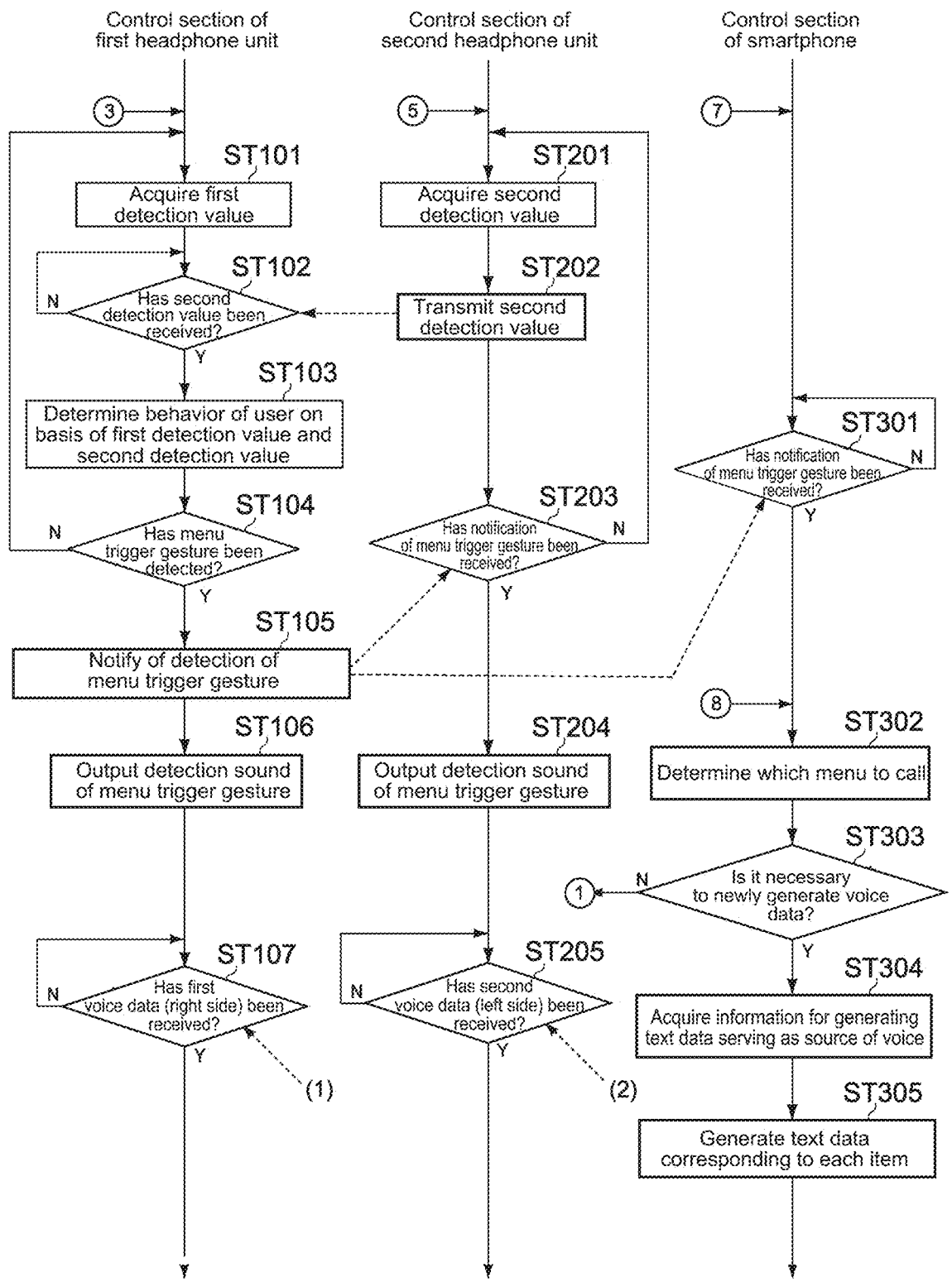
FIG. 11 is a flowchart illustrating processing performed by the information processing apparatus.
Figure 12:
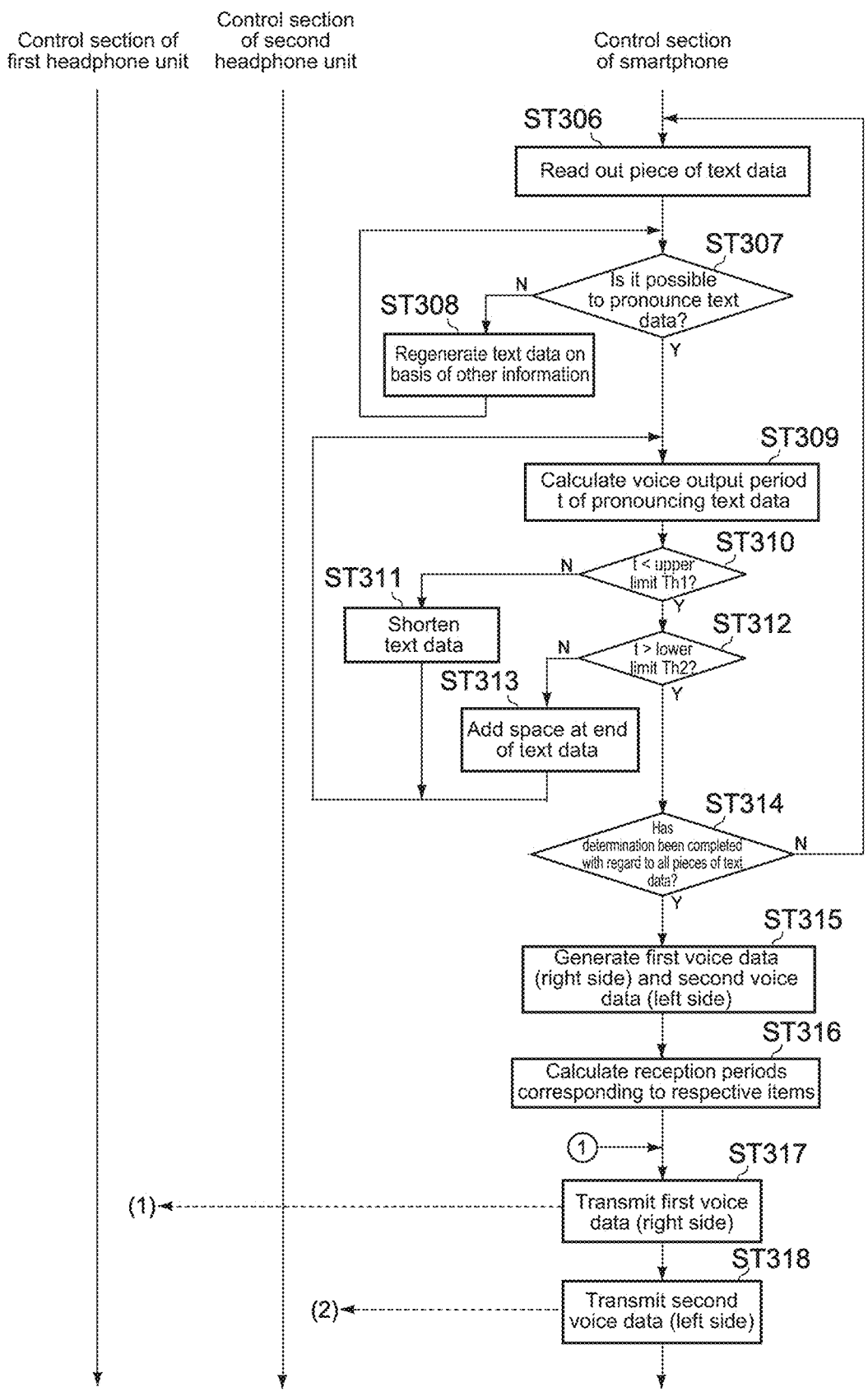
FIG. 12 is a flowchart illustrating the processing performed by the information processing apparatus.
Figure 13:
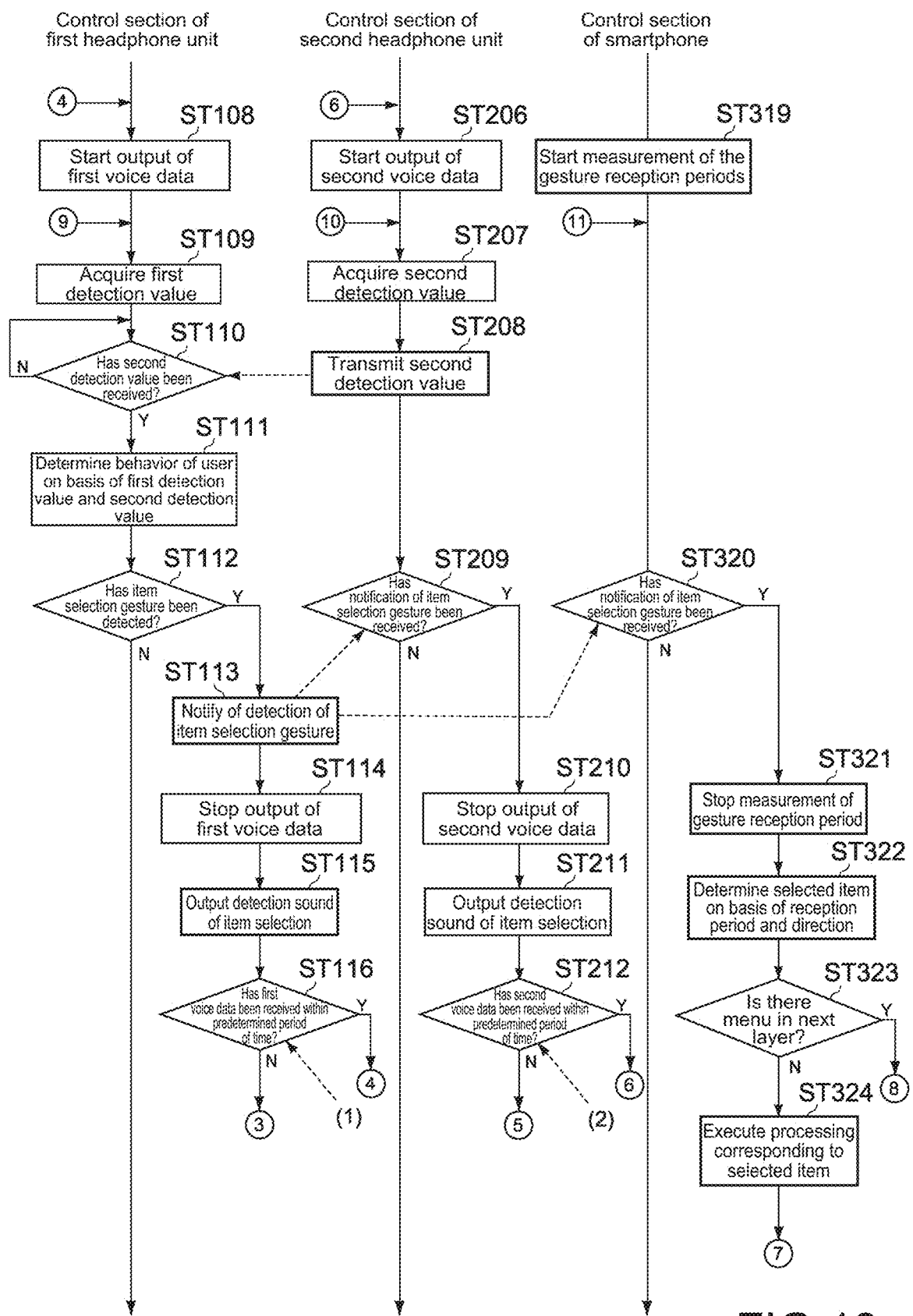
FIG. 13 is a flowchart illustrating the processing performed by the information processing apparatus.
Figure 14:
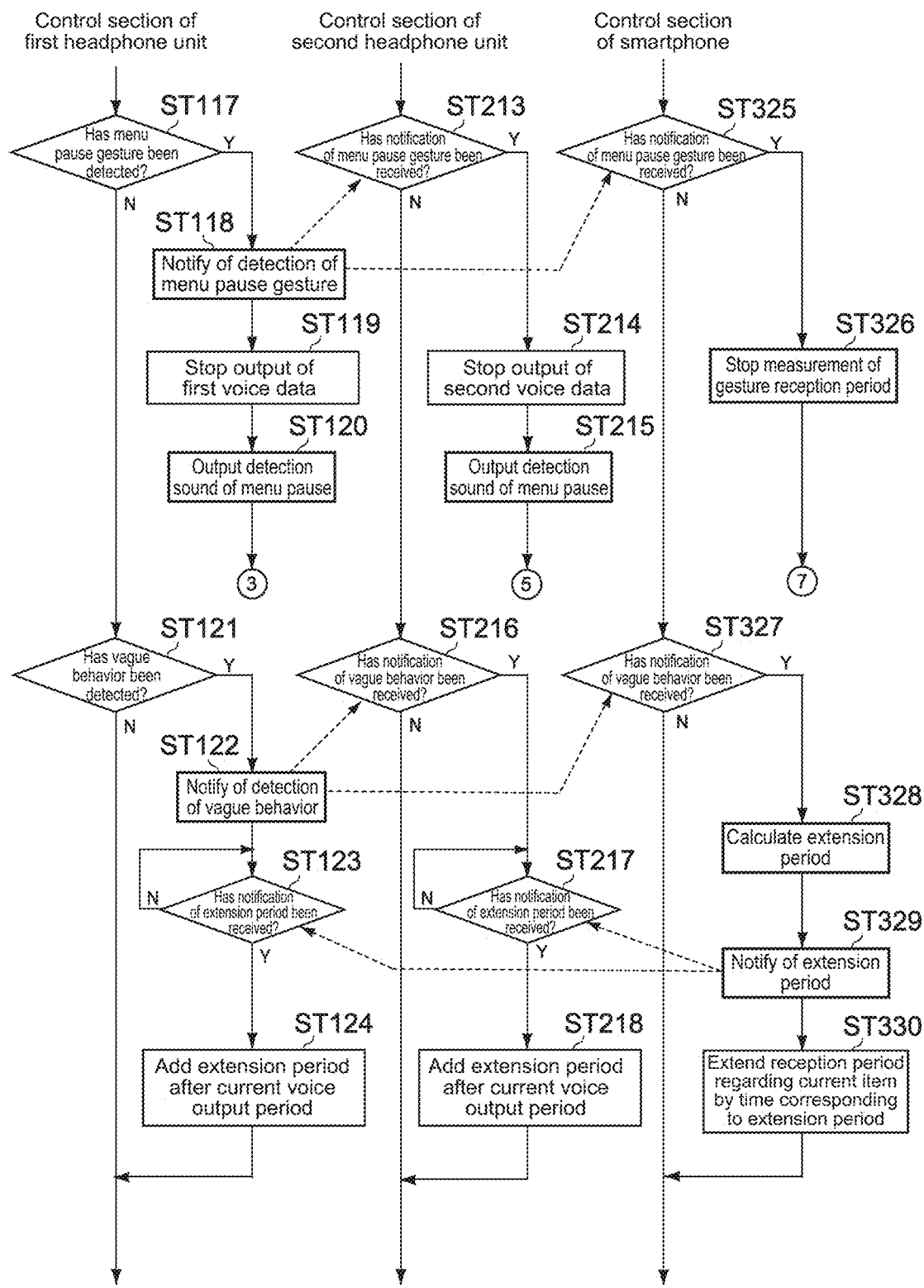
FIG. 14 is a flowchart illustrating the processing performed by the information processing apparatus.
Figure 15:
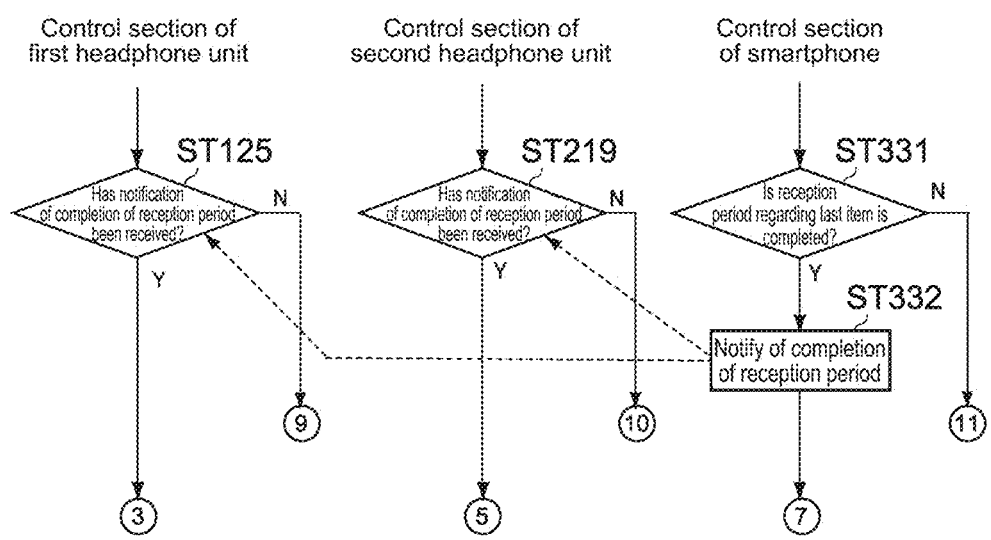
FIG. 15 is a flowchart illustrating the processing performed by the information processing apparatus.

In the example illustrated in FIG. 8, the number of layers of menus is two, which are the main menu and the submenus. However, the numbers of layers of menus may be three or more. FIG. 9 is a diagram illustrating an example of a case where the number of layers of menus is three or more.

FIG. 9 illustrates an example of a case where a first layer includes the main menu, a second layer includes a singer search menu (which is the same as the music submenu illustrated in FIG. 8), a third layer includes album search menus, and a fourth layer includes music search menus.

When an item related to "music" is selected in the main menu, the singer search menu is called. When a specific singer is selected in the singer search menu, an album search menu corresponding to the selected singer is called.

The album search menu includes items corresponding to respective albums such as "album title A" and "album title B". In addition, a voice saying "do you want to listen to A?", a voice saying "do you want to listen to B?", and the like are prepared as voices corresponding to the items.

When the user selects a specific album in the album search menu, a music search menu corresponding to the selected album is called.

The music search menu includes items corresponding to respective music tracks such as "music title a" and "music title b". In addition, a voice saying "do you want to listen to a?", a voice saying "do you want to listen to a?", and the like are prepared as voices corresponding to the items.

When the user selects a specific music track in the music search menu, the selected music track is reproduced.

With reference to FIG. 9, the example in which the number of layers with regard to the item related to "music" is three or more has been described. In a similar way, with regard to the items related to "news", "message", "schedule", "phone", "navigation", "device control", and the like, the numbers of layers may be three or more.

For example, with regard to the item related to "news", a first layer includes the main menu, a second layer includes a category search menu (not illustrated. For example, a menu including categories such as "major news" and "sports news"), and a third layer includes news search menus (which are similar to the news submenu illustrated in FIG. 8).

When the item related to "news" is selected in the main menu, the category search menu is called. The category search menu includes items corresponding to respective categories such as "major news" and "sports news". In addition, a voice saying "do you want to listen to major news?", a voice saying "do you want to listen to sports news?", and the like are prepared as voices corresponding to the items.

When the user selects a specific category in the category search menu, a news search menu corresponding to the selected category is called.

The news search menu includes items corresponding to respective news topics such as "news title A" and "news title B". In addition, a voice saying "would you like me to play A?", a voice saying "do you want to listen to B?", and the like are prepared as voices corresponding to the items.

When the user selects a specific news topic in the news search menu, content of the selected news topic is reproduced.

With reference to FIG. 8 and FIG. 9, the example in which the number of layers of menus is two or more has been described. However, the number of layers of the menus may be one.

For example, it is assumed that the number of layers of menus is only one, which is the main menu. In this case, reproduction of music, news, a schedule, or a message starts when the item related to "music", "news", "schedule", or "message" is selected in the main menu. Note that, with regard to the items related to "phone", "navigation", and the device control", it is necessary to select a callee, a destination, or a control target to perform processing. Therefore, basically, a menu in a next layer is necessary for such items.

In addition, with reference to FIG. 8, it is assumed that the number of layers of menus is only one, which is the music submenu, for example. In this case, the music submenu is directly called (by a menu trigger gesture to be described later) without using the main menu. Next, when any one of the items corresponding to "singer A", "singer B", and the like is selected in the music submenu, music of the selected singer is reproduced.

Note that, in a similar way, the submenus other than the music submenu illustrated in FIG. 8, the album search menu and the music search menu illustrated in FIG. 9, and the like may be a single layer.

[Menu Presented when Processing has Already been Executed]

FIG. 10 is a diagram illustrating an example of menus called when music reproduction processing, news reproduction processing, and the like have already been executed.

In FIG. 10, an in-music-reproduction menu is a menu called during reproduction of music, and an in-news-reproduction menu is a menu called during reproduction of news.

The in-music-reproduction menu includes six items, which are "pause", "skip to a next music track", "skip to a previous music track", "repeat the current music track", "bookmark the current music track", and "play information regarding the current music track". In addition, six questions are prepared as respective voices corresponding to these items. The six questions are: "do you want to pause it?"; "do you want to skip to a next music track?"; "do you want to skip to a previous music track?"; "do you want to repeat the current music track?"; "do you want to bookmark the current music track?"; and "do you want to listen to information regarding the current music track?".

When the user selects a specific item in the in-music-reproduction menu, processing corresponding to the item is executed. For example, when the item related to "pause" is selected, the current music track is paused.

The in-news-reproduction menu includes four items, which are "pause", "skip to a next news topic", "skip to a previous news topic", and "bookmark the current news topic". In addition, four questions are prepared as respective voices corresponding to these items. The four questions are: "do you want to pause it?"; "do you want to skip to a next news topic?"; "do you want to skip to a previous news topic?"; and "do you want to bookmark the current news topic?".

When the user selects a specific item in the in-news-reproduction menu, processing corresponding to the item is executed. For example, when the item related to "pause" is selected, reproduction of the current news topic is paused.

Note that, with regard to the items related to "message", "schedule", "phone", "navigation", "device control", and the like, such in-processing menus may be prepared.

[Relationship Between Items in Menu and Voices Corresponding to Items, Etc.]

In the respective menus illustrated in FIG. 8 to FIG. 10, the voices corresponding to the respective items are in a form of a question saying "do you want to . . . ?" or "would you like me to . . . ?". However, the voices corresponding to the items in the menus are not limited to the voices in the form of a question and any voices are allowed as long as it is possible for the user to recognize the items. For example, the voice corresponding to the item related to "music" in the main menu may be a voice saying "music", a voice saying "playback of music", a voice saying "listen to music", or the like.

In addition, the voice corresponding to the item in the menu does not have to be a speech voice. For example, with regard to the music search menu illustrated in FIG. 9, a portion (such as introduction or hook) of a corresponding music track may be used as the voice corresponding to the item instead of the speech voice saying "do you want to listen to a?", the speech voice saying "do you want to listen to b?", or the like. Alternatively, the portion of the corresponding music track may be reproduced together with the speech voice saying "do you want to listen to a?", or the speech voice saying "do you want to listen to b?".

In addition, a video corresponding to an item in a menu may be displayed on a screen of the smartphone 20 while a voice corresponding to the item is being output. For example, with regard to the music search menu illustrated in FIG. 9, a music video of a music track may be reproduced on the screen while a speech voice saying "do you want to listen to a?", a speech voice saying "do you want to listen to b?", or the like (or a portion of the music track) is being output.

<Description of Operation>

Next, processing performed by the information processing apparatus 100 will be described in detail. FIG. 11 to FIG. 15 are flowcharts illustrating the processing performed by the information processing apparatus 100.

First, the control section 4a of the first headphone unit 1a acquires a first detection value detected by the motion sensor 7a from the motion sensor 7a (Step 101).

In a similar way, the control section 4b of the second headphone unit 1b acquires a second detection value detected by the motion sensor 7b from the motion sensor 7b (Step 201). Next, the control section 4b of the second headphone unit 1b transmits the acquired second detection value to the first headphone unit 1a (Step 202).

After the acquisition of the first detection value, the control section 4a of the first headphone unit 1a determines whether the second detection value has been received from the second headphone unit 1b (Step 102). In the case where the second detection value has not been received (NO in Step 102), the control section again determines whether the second detection value has been received.

In the case where the second detection value has been received (YES in Step 102), the control section 4a of the first headphone unit 1a determines behavior of the head of the user on the basis of the first detection value and the second detection value (Step 103). Note that, according to the present embodiment, the case of using both the first detection value and the second detection value to determine the behavior of the head of the user is described. However, it is also possible to determine the behavior of the head of the user by using one of the first detection value or the second detection value (the same applies to Step 111 to be described later). In this case, the motion sensor does not have to be installed in both the first headphone unit 1a and the second headphone unit 1b. The motion sensor may be installed in only one of the first headphone unit 1a or the second headphone unit 1b.

After the determination of the behavior of the head of the user, the control section 4a of the first headphone unit 1a determines whether a menu trigger gesture has been detected on the basis of the behavior of the head of the user (Step 104). The menu trigger gesture is a user gesture for calling a menu. For example, the menu trigger gesture is a user action of turning his/her head to a specific direction.

In the case where the menu trigger gesture has not been detected (NO in Step 104), the control section 4a of the first headphone unit 1a returns to Step 101 and acquires a first detection value. Next, the control section 4a of the first headphone unit 1a receives a second detection value, determines behavior of the user, and then again determines whether a menu trigger gesture has been detected.

In the case where the menu trigger gesture has been detected (YES in Step 104), the control section 4a of the first headphone unit 1a outputs information indicating that the menu trigger gesture has been detected, to the second headphone unit 1b and the smartphone 20 (Step 105).

Next, the control section 4a of the first headphone unit 1a causes the speaker 6a to output a detection sound of the menu trigger gesture (Step 106). The detection sound of the menu trigger may be a sound effect such as "pong" or "ping", or may be a speech voice saying "I will play the menu", for example.

After the transmission of the second detection value to the first headphone unit 1a, the control section 4b of the second headphone unit 1b determines whether the first headphone unit 1a has notified of detection of the menu trigger gesture (Step 203).

In the case where the first headphone unit 1a has not notified of detection of the menu trigger gesture (NO in Step 203), the control section 4b of the second headphone unit 1b returns to Step 201 and acquires a second detection value. Next, after the transmission of the second detection value to the first headphone unit 1a, the control section 4b of the second headphone unit 1b again determines whether the first headphone unit 1a has notified of detection of a menu trigger gesture.

In the case where the first headphone unit 1a has notified of detection of the menu trigger gesture (YES in Step 203), the control section 4b of the second headphone unit 1b causes the speaker 6b to output a detection sound of the menu trigger gesture (Step 204).

Note that, the control section 4a of the first headphone unit 1a and the control section 4b of the section headphone unit 1b cause the speakers 6a and 6b to output the detection sounds of the menu trigger gesture at a same timing.

After the output of the detection sound of the menu trigger gesture, the control section 4a of the first headphone unit 1a determines whether first voice data has been received from the smartphone 20 (Step 107).

The first voice data is right-side voice data of sequentially reading out items in a menu. The first voice data is accompanied by sound image localization positions for switching sound image localization positions of the respective items alternately between left and right directions.

In the case where the first voice data has not been received (NO in Step 107), the control section 4a of the first headphone unit 1a again determines whether first voice data has been received from the smartphone 20 (state of waiting for reception of the first voice data).

After the output of the detection sound of the menu trigger gesture, the control section 4b of the second headphone unit 1b determines whether second voice data has been received from the smartphone 20 (Step 205).

The second voice data is left-side voice data of sequentially reading out items in a menu. The second voice data is accompanied by sound image localization positions for switching sound image localization positions of the respective items alternately between the left and right directions.

In the case where the second voice data has not been received (NO in Step 205), the control section 4b of the second headphone unit 1b again determines whether second voice data has been received from the smartphone 20 (state of waiting for reception of the second voice data).

Note that, here, the description is given on the assumption that the first voice data and the second voice data are voice data accompanied by the sound image localization positions. However, the first voice data and the second voice data do not have to be the voice data accompanied by the sound image localization positions.

For example, the items may be presented to the user in such a manner that one of the right-side speaker 6a or the left-side speaker 6b does not output a voice of reading out an item while the other of the speakers 6 is outputting a voice. In such a case, the first data and the second voice data do not have to be the voice data accompanied by the sound image localization positions.

The control section 12 of the smartphone 20 first determines whether the first headphone unit 1a has notified of detection of the menu trigger gesture (Step 301). In the case where the first headphone unit 1a has not notified of detection of the menu trigger gesture (NO in Step 301), the control section 12 of the smartphone 20 again determines whether the first headphone unit 1a has notified of detection of a menu trigger gesture (state of waiting for detection of the menu trigger gesture).

When the first headphone unit 1a has notified of detection of the menu trigger gesture (YES in Step 301), the control section 12 of the smartphone 20 determines which menu to call in accordance with a processing execution situation or the like (Step 302). For example, the main menu is called in the case where the music reproduction processing, the news reproduction processing, or the like is not currently being executed. On the other hand, the in-music-reproduction menu, the in-news-reproduction menu, or the like is called in the case where the music reproduction processing, the news reproduction processing, or the like is currently being executed.

After deciding which menu to call, the control section 12 of the smartphone 20 subsequently determines whether it is necessary to newly generate first voice data and second voice data with regard to the menu (Step 303). In the case where it is necessary to newly generate the first voice data and the second voice data (YES in Step 303), the control section 12 of the smartphone 20 proceeds to Step 304. On the other hand, in the case where it is not necessary to newly generate the first voice data and the second voice data (NO in Step 303), the control section 12 of the smartphone 20 proceeds to Step 317.

Here, the case where it is necessary to newly generate the first voice data and the second voice data will be described. First, at the beginning, it is necessary to newly generate the first voice data and the second voice data for all the menu. Therefore, at the beginning, it is determined that it is necessary to newly generate the first voice data and the second voice data for all the menu.

Once the first voice data and the second voice data are generated, the first voice data and the second voice data are stored in the storage section in association with their corresponding menus.

Here, for example, in the case where items are preliminarily fixed in a menu, it is not necessary to newly generate first voice data and second voice data again once the first voice data and the second voice data have been generated.

However, sometimes items dynamically change in a menu. In such a case, for example, it is necessary to newly generate first voice data and second voice data each time the menu is called.

The case where items dynamically change in a menu will be described. For example, with regard to the news submenu (see FIG. 8), it is assumed that a menu is generated by arranging latest news topics in the order from top to bottom. In this case, there is a possibility that items dynamically change in the news submenu. Therefore, for example, the first voice data and the second voice data corresponding to the news submenu are newly generated when the news submenu is called.

In addition, with regard to the message submenu (see FIG. 8), it is assumed that a menu is generated by arranging latest messages in the order from top to bottom. In this case, there is a possibility that items dynamically change in the message submenu. Therefore, for example, the first voice data and the second voice data corresponding to the message submenu are newly generated when the message submenu is called.

In addition, with regard to the phone submenu (see FIG. 8), it is assumed that a menu is generated by arranging callees in the order from top to bottom in such a manner that a callee with latest outgoing call date and time comes at the top of an outgoing call history. Alternatively, it is assumed that a menu is generated by arranging callees in the order from top to bottom in such a manner that a callee with the largest number of outgoing calls comes at the top of the outgoing call history. In this case, there is a possibility that items dynamically change in the phone submenu. Therefore, for example, the first voice data and the second voice data corresponding to the phone submenu are newly generated when the phone submenu is called.

In the case where it is necessary to newly generate the first voice data and the second voice data (YES in Step 303), the control section 12 of the smartphone 20 acquires information for generating text data serving as a source of a voice corresponding to an item.

For example, information regarding the item (such as music) is acquired in the main menu, information regarding a singer name is acquired in the music submenu, and information regarding a news title is acquired in the news submenu.

After the acquisition of such information, the control section of the smartphone subsequently generates text data serving as a source of a voice corresponding to an item on the basis of such information with regard to each item (Step 305).

For example, text data such as "do you want to listen to music?" or "do you want to listen to news?" is generated in the main menu on the basis of the information regarding the item (such as music), and text data such as "do you want to listen to music of singer A?" or "do you want to listen to music of singer B?" is generated in the music submenu on the basis of the information regarding the singer names. In addition, text data such as "would you like me to play A?" or "would you like me to play B?" is generated in the news submenu on the basis of the information regarding the news title.

After the generation of the text data for each of items in the called menu, the control section 12 of the smartphone 20 subsequently reads out one of the pieces of text data from the storage section (Step 306). Next, the control section 12 of the smartphone 20 determines whether it is possible to pronounce the piece of text data (Step 307).

Here, a case where it is impossible to pronounce the text data will be described. For example, in the case where a music title, a schedule title, or the like only includes a sign such as "Δ" or "○", it is impossible to pronounce "Δ" and "○" with regard to pieces of text data such as "do you want to listen to Δ?" and "would you like me to play ○?".

In the case where it is impossible to pronounce the text data (NO in Step 307), the control section 12 of the smartphone 20 regenerates text data on the basis of other information (Step 308).

For example, in the case where a music title is "Δ" and it is impossible to pronounce the text data, text data such as "do you want to listen to the third music track?" is regenerated on the basis of information other than the music title such as meta data indicating the order of the music track in the album. Alternatively, in the case where a schedule title is "○" and it is impossible to pronounce its text data, text data such as "do you want to listen to your schedule for December 10?" is regenerated on the basis of information other than the schedule title such as information regarding date and time.

After the regeneration of the text data, the control section 12 of the smartphone 20 again determines whether it is possible to pronounce the text data (Step 307).

In the case where it is possible to pronounce the text data (YES in Step 307), the control section 12 of the smartphone 20 calculates a voice output period t of pronouncing the text data (Step 309). Next, the control section 12 of the smartphone 20 determines whether the voice output period t is less than an upper limit value Th1 (Step 310).

In the case where the voice output period t is the upper limit value Th1 or more (NO in Step 310), the control section 12 of the smartphone 20 shortens the text data (Step 311). Next, the control section 12 of the smartphone 20 again calculates a voice output period t of pronouncing text data, and determines whether the voice output period t is less than the upper limit value Th1.

For example, it is assumed that a music title in the music search menu is a long music title such as "ABCD-EFGHIJKLMN", and a voice output period t of pronouncing text data such as "do you want to listen to ABCD-EFGHIJKLMN?" is the upper limit value Th1 or more.

In this case, the control section 12 of the smartphone 20 deletes alphabets after "E" from the music title and generates text data such as "do you want to listen to ABCD?", for example. Alternatively, the control section 12 of the smartphone 20 deletes words "do you want to listen to" and generates text data that only includes the music title such as "ABCD-EFGHIJKLMN". In the case where the text data that only includes the music title such as "ABCD-EFGHIJKLMN" also exceeds the upper limit value Th1, the control section 12 of the smartphone 20 regenerates text data that only includes a portion of the music title such as "ABCD".

In addition, for example, it is assumed that the news submenu includes a long news title such as "typhoon is approaching tonight", "chain-reaction crash on Tōmei Expressway", or "situation of election for House of Representatives". In addition, it is assumed that a voice output period t of pronouncing text data such as "would you like me to play 'typhoon is approaching tonight'?", "would you like me to play 'chain-reaction crash on Tōmei Expressway'?", or "would you like me to play 'situation of election for House of Representatives'?" is the upper limit value Th1 or more.

In this case, the control section 12 of the smartphone 20 extracts important words such as "typhoon", "crash on Tōmei Expressway", or "election" from the news title such as "typhoon is approaching tonight", "chain-reaction crash on Tōmei Expressway", or "situation of election for House of Representatives", for example. Next, the smartphone 20 generates text data such as "would you like me to play 'typhoon'?", "would you like me to play 'crash on Tōmei Expressway'?", or "would you like me to play 'election'?". Alternatively, the control section 12 of the smartphone 20 deletes words "do you want to listen to" and generates text data that only includes the news title such as "typhoon is approaching tonight", "chain-reaction crash on Tōmei Expressway", or "situation of election for House of Representatives".

In the case where the text data that only includes the news title such as "typhoon is approaching tonight", "chain-reaction crash on Tōmei Expressway", or "situation of election for House of Representatives" is also the upper limit value Th1 or more, the control section 12 of the smartphone 20 generates text data that only includes a portion of the news title such as "typhoon", "crash on Tōmei Expressway", or "election".

In addition, for example, it is assumed that a destination name in the navigation submenu is a long destination name such as "ABCDEFGHI-machi 1-chome", and a voice output period t of pronouncing text data such as "do you want to go to ABCDEFGHI-machi 1-chome?" is the upper limit value Th1 or more. In this case, the control section 12 of the smartphone 20 deletes words "do you want to go to" and generates text data that only includes the destination name such as "ABCDEFGHI-machi 1-chome".

In addition, for example, with regard to the destination name, it is assumed that destination names in which the beginning portion is common but the end portions are different from each other are successively arranged as the items such as "ABCDEFGHI-machi 1-chome", "ABCDEFGHI-machi 2-chome", and "ABCDEFGHI-machi 3-chome". In this case, the common portion (ABCDEFGHI-machi) is deleted from pieces of the text data other than the piece of text data "ABCDEFGHI-machi 1-chome", and pieces of text data such as "do you want to go to 2-chome?" and "do you want to go to 3-chome?" are generated.

Note that, in the above-described example, the text data serving as a source corresponding to an item is shortened (changed) in the case where its voice output period t is the upper limit value Th1 or more (voice output period t does not fall within a predetermined range). Alternatively, it is also possible to accelerate (change) reproduction speed of the voice corresponding to the item in the case where its voice output period t is the upper limit value Th1 or more (voice output period t does not fall within the predetermined range). Alternatively, it is also possible to combine the method of shortening the text data and the method of accelerating the reproduction speed.

In the case where the voice output period t is less than the upper limit value Th1 in Step 310 (YES in Step 310), the control section 12 of the smartphone 20 determines whether the voice output period t exceeds a lower limit value Th2 (Step 312).

In the case where the voice output period t is the lower limit value Th2 or less, the control section 12 of the smartphone 20 adds a space at the end of text data (Step 313). Next, the control section 12 of the smartphone 20 again calculates a voice output period t of pronouncing the text data, and determines whether the voice output period t exceeds the lower limit value Th2.

There is a possibility that it is impossible to present items to the user in good tempo when values of the upper limit value Th1 and the lower limit value Th2 are too long. In addition, there is a possibility that it is impossible for the user to make an item selection gesture in time when values of the upper limit value Th1 and the lower limit value Th2 are too short (in general, it takes about two seconds from start of the gesture to detection of the gesture). The values of the upper limit value Th1 and the lower limit values Th2 are set in advance by taking into consideration the above-described circumstances. For example, the value of the upper limit value th1 is set to about three seconds, and the value of the lower limit value th2 is set to about two seconds.

Here, for example, with regard to the music search menu, it is assumed that a music title is a short music title such as "1" (pronounced as "ichi" in Japanese) or "2" (pronounced as "ni" in Japanese) and text data of a voice corresponding to an item is short text data such as "1" or "2". Note that, in this example, it is assumed that the text data does not includes a sentence such as "do you want to listen to" before the music title.

In this case, it is determined that a voice output period t of pronouncing "ichi" or "ni" is the lower limit value Th2 or less. In this case, the space is added after the text data of "ichi" or "ni" in such a manner that its voice output period t exceeds the lower limit value Th2. Note that, in this case, the number of syllables constituting "ichi" or "ni" may be taken into consideration (with regard to the consideration of the number of syllables, the same applies to the case where text data is long). For example, in the case where the number of syllables is four or less and the voice output period t is determined to be the lower limit value Th2 or less (the voice output period t is determined to be short), a space corresponding to three syllables is added after "ichi" (two syllables), or a space corresponding to four syllables is added after "ni" (single syllable) in the text data.

Note that, in the above-described example, the space is added to the text data serving as a source of a voice corresponding to an item (the text data is changed) in the case where its voice output period t is the lower limit value Th2 or less (its voice output period t does not fall within the predetermined range). Alternatively, it is also possible to decelerate (change) reproduction speed of the voice corresponding to the item in the case where its voice output period t is the lower limit value Th2 or less (its voice output period t does not fall within the predetermined range). Alternatively, it is also possible to combine the method of adding a space to text data and the method of decelerating reproduction speed.

In the case where the voice output period t exceeds the lower limit value Th2 in Step 312 (YES in Step 312), the control section 12 of the smartphone 20 determines whether various kinds of determination processing have been completed with regard to all pieces of text data (Step 314). In the case where there is a piece of text data that has not been subjected to various kinds of determination processing (NO in Step 314), the control section 12 of the smartphone 20 returns to Step 306, reads out the piece of text data from the storage section, and executes processing in Step 307 and subsequent steps.

In the case where a portion of a corresponding music track is used as a voice corresponding to an item instead of (or in addition to) the speech voice, the length of the music track may be adjusted in such a manner that the length of the music track falls within a predetermined range (from the upper limit value Th1 to the lower limit value Th2), for example. In addition, in the case where a music video of the music track is reproduced on the screen on the smartphone 20 while the voice corresponding to the item of the music track is being output, the length of the video may be adjusted in such a manner that the length of the video falls within a predetermined range (from the upper limit value Th1 to the lower limit value Th2), for example.

Note that, in Step 309 to Step 313, the control section 12 of the smartphone 20 adjusts the length of the voice output period t in such a manner that the gesture reception periods T regarding the respective items corresponding to the voices have constant lengths. At this time, the control section 12 of the smartphone 20 adjusts the length of the voice output period t in such a manner that the length of the voice output period t falls within the predetermined range from the upper limit value Th1 and the lower limit value Th2.

In the case where the various kinds of determination processing have been completed with regard to all the pieces of text data in Step 314 (YES in Step 314), the control section applies text-to-speech (TTS) processing to the text data, and generates first voice data (right side) and second voice data (left side) (Step 315). Next, the first voice data and the second voice data are stored in the storage section in association with the menus.

Next, the control section 12 of the smartphone 20 calculates gesture reception periods T corresponding to the respective items, and stores the gesture reception periods T in the storage section (Step 316).

With reference to FIG. 7, details of the gesture reception periods T will be described. As illustrated in FIG. 7, typically, the control section 12 of the smartphone 20 sets a period from start of output of a voice corresponding to an item from a specific direction to start of output of a next voice from the same direction, as the second gesture reception period T corresponding to the item.

For example, the control section of the smartphone sets a period from start of output of a voice saying "do you want to listen to music?" from the right direction to start of output of a next voice saying "do you want to listen to a message?" from the right direction, as a gesture reception period T1 corresponding to an item related to "music".

Note that, the length of the gesture reception period T1 corresponding to the item related to "music" is a length obtained by adding a voice output period t1 of the voice saying "do you want to listen to music?" to a voice output period t2 of a voice saying "do you want to listen to news?".

In a similar way, the control section of the smartphone sets a period from start of output of the voice saying "do you want to listen to news?" from the left direction to start of output of a next voice saying "do you want to listen to your schedule?" from the left direction, as a gesture reception period T2 corresponding to an item related to "news".

Note that, the length of the gesture reception period T2 corresponding to the item related to "news" is a length obtained by adding a voice output period t1 of the voice saying "do you want to listen to news?" to a voice output period t2 of a voice saying "do you want to listen to a message?".

In similar ways, the control section 12 of the smartphone 20 sets gesture reception periods T3 to T5 corresponding to items related to "message", "schedule", and "phone".

Here, a voice saying "do you want to start navigation?" is a last voice output from the left direction. In a similar way, a voice saying "do you want to control your device?" is a last voice output from the right direction. Therefore, no voice is output from the same directions after such voices.

Therefore, in this case, the control section 12 of the smartphone 20 sets a period obtained by adding a predetermined time to a period (voice output period t) from start to end of output of a voice corresponding to an item, as a gesture reception period T corresponding to the item. For example, the predetermined additional time is the same time period as the voice output period t corresponding to the item.

For example, the control section 12 of the smartphone 20 sets a period obtained by adding a predetermined time (such as a period that is equivalent to a voice output period t6) to the voice output period t6 of the voice saying "do you want to start navigation?", as a gesture reception period T6 corresponding to the item related to "navigation".

In a similar way, the control section 12 of the smartphone 20 sets a period obtained by adding a predetermined time (such as a period that is equivalent to a voice output period t7) to the voice output period t7 of the voice saying "do you want to control your device?", as a gesture reception period T7 corresponding to the item related to "device control".

After the gesture reception period T is set, the control section 12 of the smartphone 20 proceeds to next Step 317. Note that, in a similar way, the control section 12 of the smartphone 20 also proceeds to Step 317 even in the case where it is not necessary to newly generate the first voice data and the second voice data in Step 303 (in the case where the first voice data, the second voice data, and the gesture reception period T have already been generated).

In Step 317, the control section 12 of the smartphone 20 transmits the first voice data to the first headphone unit 1a. Next, the control section 12 of the smartphone 20 transmits the second voice data to the second headphone unit 1b (Step 318).

When the first voice data transmitted from the smartphone 20 has been received (YES in Step 107), the control section 4a of the first headphone unit 1a starts output of the first voice data (Step 108). In a similar way, when the second voice data transmitted from the smartphone 20 has been received (YES in Step 205), the control section 4b of the second headphone unit 1b starts output of the second voice data (Step 206).

When the speakers 6a and 6b output the first voice data and the second voice data, voices corresponding to the respective items in the menu are presented to the user alternately from the right direction and the left direction with regard to the respective items.

When the first voice data and the second voice data are transmitted, the control section 12 of the smartphone 20 starts measurement of the gesture reception periods T with regard to the right direction and the left direction (Step 319).

Note that, start timings of output of the first voice data, start timings of output of the second voice data, or start timings of measurement of the gesture reception period T are synchronous among the first headphone unit 1a, the second headphone unit 1b, and the smartphone 20 in such a manner that these timings are the same timing.

After the start of output of the first voice data, the control section 4a of the first headphone unit 1a acquires a first detection value from the motion sensor 7a (Step 109). Next, the control section 4a of the first headphone unit 1a determines whether a second detection value has been received from the second headphone unit 1b (Step 110).

After the start of output of the second voice data, the control section 4b of the second headphone unit 1b acquires the second detection value from the motion sensor 7b (Step 207), and transmits the acquired second detection value to the first headphone unit 1a (Step 208).

When the second detection value is received (YES in Step 110), the control section 4a of the first headphone unit 1a determines behavior of the head of the user on the basis of the first detection value and the second detection value (Step 111).

Next, the control section 4a of the first headphone unit 1a determines whether an item selection gesture has been detected on the basis of the behavior of the head of the user (Step 112).

The item selection gesture is a user gesture for selecting an item. According to the present embodiment, the item selection gesture is a user gesture of quickly turning his/her face to the right direction or the left direction. Note that, the item selection gesture is a gesture that is distinguishable from a user action of slowly turning to the right direction or the left direction in his/her regular life.

To distinguish the item selection gesture from the user behavior performed in his/her regular life or the like, a threshold for detecting the item selection gesture (a threshold of speed of turning to a direction or a threshold of an angle of the turn) is appropriately set. Note that, the item selection gesture may be any gesture as long as the gesture is a gesture toward the right direction or the left direction (voice output direction). For example, the gesture may be a user gesture of reaching his/her hand to the right direction or the left direction, a user gesture of pointing in the right direction or the left direction, or the like. To detect such gestures, an imaging section may be installed in the headphones 10 or the smartphone 20, for example.

In the case where the item selection gesture has been detected (YES in Step 112), the control section 4a of the first headphone unit 1a transmits information indicating that the item selection gesture has been detected, to the second headphone unit 1b and the smartphone 20 (Step 113). Note that, the information to be transmitted includes information regarding the direction (right direction or left direction) of the item selection gesture.

Next, the control section 4a of the first headphone unit 1a stops output of the first voice data (Step 114), and causes the speaker 6a to output a detection sound of the item selection gesture (Step 115). The detection sound of the item selection gesture may be a sound effect such as "pong" or "ping", or may be a speech voice related to the selected item such as a voice saying "news is selected" or a voice saying "I will play news".

After the transmission of the second detection value to the first headphone unit 1a, the control section 4b of the second headphone unit 1b determines whether the first headphone unit 1a has notified of information indicating that the item selection gesture has been detected (Step 209).

In the case where the first headphone unit 1a has notified of the information indicating that the item selection gesture has been detected (YES in Step 209), the control section 4b of the second headphone unit 1b stops output of the second voice data (Step 210). Next, the control section 4b of the second headphone unit 1b causes the speaker 6b to output the detection sound of the item selection gesture (Step 211).

Note that, timings of output of the detection sound of the item selection gesture are synchronous among the first headphone unit 1a and the second headphone unit 1b in such a manner that these timings are the same timing.

After the start of measurement of the gesture reception period T, the control section 12 of the smartphone 20 determines whether the first headphone unit 1a has notified of information indicating that the item selection gesture has been detected (Step 320).

In the case where the first headphone unit 1a has notified of information indicating that the item selection gesture has been detected (YES in Step 320), the control section 12 of the smartphone 20 stops the measurement of the gesture reception periods T (Step 321). Next, the control section 12 of the smartphone 20 determines an item selected by the user on the basis of information regarding the gesture reception period T and the direction of the item selection gesture (right direction or left direction) (Step S322).

For example, with reference to FIG. 7, the control section 12 of the smartphone 20 determines that the user has selected the item related to "news" in the case where the user makes an item selection gesture of turning to the left direction during the reception period T2 corresponding to the item related to "news".

After the determination of the item selected by the user, the control section 12 of the smartphone 20 determines whether there is a menu in a next layer (lower layer) with regard to the selected item (Step 323).

In the case where there is no menu in the next layer with regard to the selected item (NO in Step 323), the smartphone 20 executes processing corresponding to the selected item. For example, news reproduction processing is executed in the case where there is no menu in the next layer with regard to the item related to "news" (in the case where there is no news submenu illustrated in FIG. 8).

On the other hand, in the case where there are menus in the next layer with regard to the selected item (YES in Step 323), the control section 12 of the smartphone 20 returns to Step 302 and determines which menu to call (a menu in the next layer).

For example, the news submenu that is a menu in the next layer is called when the item related to "news" is selected in the case where there is the menu in the next layer with regard to the item related to "news" (in the case where there is the news submenu illustrated in FIG. 8).

Next, the control section 12 of the smartphone 20 performs processing in Step 303 to Step 316 with regard to the menu in the next layer. Next, the control section 12 of the smartphone 20 transmits first voice data related to the menu in the next layer to the first headphone unit 1a (Step 317), and transmits second voice data related to the menu in the next layer to the second headphone unit 1b (Step 318).

After the output of the detection sound of the item selection gesture, the control section 4a of the first headphone unit 1a determines whether the first voice data related to the menu in the next layer has been received within a predetermined period of time (Step 116).

In the case where the first voice data related to the next layer has been received within the predetermined period of time (YES in Step 116), the control section 4a of the first headphone unit 1a returns to Step 108 and starts output of the first voice data. On the other hand, in the case where the first voice data related to the next layer has not been received within the predetermined period of time (NO in Step 116), the control section 4a of the first headphone unit 1a returns to Step 101 and acquires a first detection value from the motion sensor 7a.

After the output of the detection sound of the item selection gesture, the control section 4b of the second headphone unit 1b determines whether second voice data related to the menu in the next layer has been received within a predetermined period of time (Step 212).

In the case where the second voice data related to the next layer has been received within the predetermined period of time (YES in Step 212), the control section 4b of the second headphone unit 1b returns to Step 206 and starts output of the second voice data. On the other hand, in the case where the second voice data related to the next layer has not been received within the predetermined period of time (NO in Step 212), the control section 4b of the second headphone unit 1b returns to Step 201 and acquires a second detection value from the motion sensor 7b.

In the case where the item selection gesture has not been detected in Step 112 (NO in Step 112), the control section 4a of the first headphone unit 1a proceeds to next Step 117. In Step 117, the control section 4a of the first headphone unit 1a determines whether a menu pause gesture has been detected on the basis of behavior of the head of the user.

The menu pause gesture is a user gesture for pausing reproduction of a menu. For example, the menu pause gesture is a user gesture of quickly shaking his/her head in the right direction and the left direction (which is a general action performed by a person when giving negative feedback).

Note that, the menu pause gesture is not limited to the action of quickly shaking his/her head in the right direction and the left direction. For example, the menu pause gesture may be an action of quickly waving his/her hand in the right direction and the left direction. To detect such gestures, an imaging section may be installed in the headphones 10 or the smartphone 20, for example.

In the case where the menu pause gesture has been detected (YES in Step 117), the control section 4a of the first headphone unit 1a transmits information indicating that the menu pause gesture has been detected, to the second headphone unit 1b and the smartphone 20 (Step 118).

Next, the control section 4a of the first headphone unit 1a stops output of the first voice data (Step 119), and causes the speaker 6a to output a detection sound of the menu pause gesture (Step 120). The detection sound of the menu pause may be a sound effect such as "pong" or "ping", or may be a speech voice saying "I will stop playing the menu".

After the output of the detection sound of the menu pause gesture, the control section 4a of the first headphone unit 1a returns to Step 101 and acquires a first detection value again from the motion sensor 7a.

In the case where the first headphone unit 1a has not notified of detection of the item selection gesture (NO in Step 209), the control section 4b of the second headphone unit 1b proceeds to Step 213. In Step 213, the control section 4b of the second headphone unit 1b determines whether the first headphone unit 1a has notified of information indicating that the menu pause gesture has been detected.

In the case where the first headphone unit 1a has notified of the information indicating that the menu pause gesture has been detected (YES in Step 213), the control section 4b of the second headphone unit 1b stops output of the second voice data (Step 214). Next, the control section 4b of the second headphone unit 1b causes the speaker 6b to output the detection sound of the menu pause gesture (Step 215).

Note that, timings of output of the detection sound of the menu pause gesture are synchronous among the first headphone unit 1a and the second headphone unit 1b in such a manner that these timings are the same timing.

After the output of the detection sound of the menu pause gesture, the control section 4b of the second headphone unit 1b returns to Step 201 and acquires a second detection value again from the motion sensor 7b.

In the case where the first headphone unit 1a has not notified of detection of the item selection gesture (NO in Step 320), the control section 12 of the smartphone 20 proceeds to next Step 325. In Step 325, the control section 12 of the smartphone 20 determines whether the first headphone unit 1a has notified of information indicating that the menu pause gesture has been detected.

In the case where the first headphone unit 1a has notified of information indicating that the menu pause gesture has been detected (YES in Step 325), the control section 12 of the smartphone 20 stops measurement of the gesture reception period T (Step 326). Next, the control section 12 of the smartphone 20 returns to Step 301, and determines whether the first headphone unit 1a has notified of detection of the menu trigger gesture.

In the case where the menu pause gesture has not been detected in Step 117 (NO in Step 117), the control section 4a of the first headphone unit 1a proceeds to Step 121. In Step 121, the control section 4a of the first headphone unit 1a determines whether vague behavior has been detected on the basis of behavior of the head of the user.

Here, the vague behavior will be described. As described above, when the user quickly turns his/her face to the right direction or the left direction, such behavior is detected as the item selection gesture. On the other hand, in the case where the user slowly turns his/her face to the right direction or the left direction or in the case where an angle of turning his/her face is not sufficient, such behavior is not detected as the item selection gesture. According to the present embodiment, for example, the vague behavior is not detected as the item selection gesture, but the vague behavior is similar to the item selection gesture.

In the case where the vague behavior has been detected (YES in Step 121), the control section 4a of the first headphone unit 1a transmits information indicating that the vague behavior has been detected, to the second headphone unit 1b and the smartphone 20 (Step 122). For example, the information to be transmitted includes information indicating how much the detected vague behavior is similar to the item selection gesture.

Next, the control section 4a of the first headphone unit 1a determines whether the smartphone 20 has notified of an extension period (Step 123). The extension period is a period for extending the gesture reception period T regarding the item corresponding to the currently output voice.

In the case where the smartphone 20 has not notified of the extension period (NO in Step 123), the control section 4a of the first headphone unit 1a again determines whether the smartphone 20 has notified of an extension period (state of waiting for notification of the extension period).

In the case where the first headphone unit 1a has not notified of detection of the menu pause gesture (NO in Step 213), the control section 4b of the second headphone unit 1b proceeds to Step 216. In Step 216, the control section 4b of the second headphone unit 1b determines whether the first headphone unit 1a has notified of information indicating that vague behavior has been detected.

In the case where the first headphone unit 1a has notified of the information indicating that the vague behavior has been detected (YES in Step 216), the control section 4b of the second headphone unit 1b determines whether the smartphone 20 has notified of an extension period (Step 217). In the case where the smartphone 20 has not notified of the extension period (NO in Step 217), the control section 4b of the second headphone unit 1b again determines whether the smartphone 20 has notified of an extension period (state of waiting for notification of the extension period).

In the case where the first headphone unit 1a has not notified of detection of the menu pause gesture (NO in Step 325), the control section 12 of the smartphone 20 proceeds to Step 327. In Step 327, the control section 12 of the smartphone 20 determines whether the first headphone unit 1a has notified of information indicating that the vague behavior has been detected.

In the case where the first headphone unit 1a has notified of the information indicating that the vague behavior has been detected (YES in Step 327), the control section 12 of the smartphone 20 calculates an extension period. The length of the extension period is set in such a manner that the extension period becomes longer as the vague behavior is more similar to the item selection gesture. Note that, here, the case where the extension period is variable has been described. However, the extension period may be constant.

After the calculation of the extension period, the control section 12 of the smartphone 20 subsequently transmits information indicating the extension period to the first headphone unit 1a and the second headphone unit 1b (Step 329).

Next, the control section 12 of the smartphone 20 extends each of the first gesture reception period T regarding the current item and the second gesture reception period T regarding the current item by time corresponding to the extension period (Step 330).

When the smartphone 20 notifies of the extension period (YES in Step 123), the control section 4a of the first headphone unit 1a proceeds to Step 124. In Step 124, the control section 4a of the first headphone unit 1a adds the extension period after the current voice output period t.

For example, in Step 124, the control section 4a of the first headphone unit 1a temporarily stops output of the first voice data after output of a voice corresponding to the current item is completed. Next, when the time corresponding to the extension period elapses after the temporary stop timing, the control section 4a of the first headphone unit 1a restarts output of the first voice data. As described above, the control section 4a of the first headphone unit 1a adds the extension period after the current voice output period t. Note that, it is also possible to output a sound effect for distinguishing items during the extension period.

When the smartphone 20 notifies of the extension period (YES in Step 217), the control section 4b of the second headphone unit 1b proceeds to Step 218. In Step 218, the control section 4b of the second headphone unit 1b adds the extension period after the current voice output period t.

For example, in Step 218, the control section 4b of the second headphone unit 1b temporarily stops output of the second voice data after output of a voice corresponding to the current item is completed. Next, when the time corresponding to the extension period elapses after the temporary stop timing, the control section 4b of the second headphone unit 1b restarts output of the second voice data. As described above, the control section 4b of the second headphone unit 1b adds the extension period after the current voice output period t. Note that, it is also possible to output a sound effect for distinguishing items during the extension period.

With reference to FIG. 7, for example, it is assumed that the user slowly turns to the right direction or the left direction and vague behavior is detected at any timing during the voice output period t2 of a voice saying "do you want to listen to news?". In this case, the first voice data and the second voice data are temporarily stopped after the output of the voice saying "do you want to listen to news?" is completed.

Next, when time corresponding to the extension period elapses after the temporary stop timing, output of the first voice data and the second voice data is restarted and a voice saying "do you want to listen to a message?" is output. Note that, it is also possible to reproduce the voice saying "do you want to listen to news?" again during the extension period (that is, the voice saying "do you want to listen to news?" is reproduced twice).

In the case where the vague behavior has been detected during the voice output period t2 of the voice saying "do you want to listen to news?", the gesture reception period T1 corresponding to the item related to "music" is extended by the time corresponding to the extension period in the first gesture reception period T. On the other hand, in the second gesture reception period T, the gesture reception period T2 corresponding to the item related to "news" is extended by the time corresponding to the extension period.

In this case, the item related to "music" or the item related to "news" is selected in the case where the user has quickly turned to the right direction or the left direction during the extension period and the item selection gesture has been detected.

Note that, in the case where the user has performed the vague behavior, the degree of vagueness of the behavior (how much the vague behavior is similar to the item selection gesture) may be displayed on the screen of the smartphone 20. In this case, color may be displayed on the screen of the smartphone 20 in such a manner that the color changes in accordance with the vagueness of the behavior. In addition, in the case where the user has performed the vague behavior, the user may be notified of detection of the vague behavior by sound.

In the case where the first headphone unit 1a has not notified of the vague behavior (NO in Step 327), the control section 12 of the smartphone 20 proceeds to Step 331. In Step 331, the control section 12 of the smartphone 20 determines whether a gesture reception period T regarding a last item is completed.

In the case where the gesture reception period T regarding the last item is not completed (NO in Step 331), the control section 12 of the smartphone 20 returns to Step 320, and determines whether the first headphone unit 1a has notified of detection of the item selection gesture.

On the other hand, in the case where the gesture reception period T regarding the last item is completed (YES in Step 331), the control section 12 of the smartphone 20 transmits information indicating that the gesture reception period T regarding the last item is completed, to the first headphone unit 1a and the second headphone unit 1b (Step 332).

In the case where the vague behavior has not been detected in Step 121 (NO in Step 121), the control section 4a of the first headphone unit 1a determines whether the smartphone 20 has notified of completion of the gesture reception period T regarding the last item (Step 125).

In the case where the smartphone 20 has not notified of completion of the gesture reception period T (NO in Step 125), the control section 4a of the first headphone unit 1a returns to Step 109 and acquires a first detection value from the motion sensor 7a.

On the other hand, in the case where the smartphone 20 has notified of completion of the gesture reception period T (YES in Step 125), the control section 4a of the first headphone unit 1a returns to Step 101 and acquires a first detection value from the motion sensor 7a.

In the case where the first headphone unit 1a has not notified of the vague behavior in Step 216 (NO in Step 216), the control section 4b of the second headphone unit 1b determines whether the smartphone 20 has notified of completion of the gesture reception period T regarding the last item (Step 219).

In the case where the smartphone 20 has not notified of completion of the gesture reception period T (NO in Step 219), the control section 4b of the second headphone unit 1b returns to Step 207 and acquires a second detection value from the motion sensor 7b.

On the other hand, in the case where the smartphone 20 has notified of completion of the gesture reception period T (YES in Step 219), the control section 4b of the second headphone unit 1b returns to Step 201 and acquires a second detection value from the motion sensor 7b.

<Workings, Etc.>

According to the present embodiment, output of voices corresponding to respective items in a menu is controlled in such a manner that the voices corresponding to the respective items are output to the user alternately from the first direction and the second direction with regard to the respective items. In other words, according to the present embodiment, the items in the menu are audibly presented to the user in such a manner that the respective items are separated by directions and time.

It is possible to appropriately present the items to the user when the items are presented to the user in such a manner that the respective items are separated by the directions and time as described above. Note that, sometimes it is impossible to appropriately present the items to the user in the case where the respective items are separated only by the directions or in the case where the respective items are separated only by time (to be described later).

In addition, according to the present embodiment, an item corresponding to a voice output from the right direction is selected in response to an item selection gesture in the right direction, and an item corresponding to a voice output from the left direction is selected in response to an item selection gesture in the left direction. This allows the user to select the item by making the item selection gesture in a direction from which the voice corresponding to the item has come. Therefore, it is possible for the user to intuitively select the item.

In addition, according to the present embodiment, the gesture reception period T is set for each of items corresponding to voices. In particular, according to the present embodiment, the first gesture reception period T of selecting items corresponding to voices output from the right direction and the second gesture reception period T of selecting items corresponding to voices output from the left direction are set as the gesture reception periods T.

This makes it possible to appropriately set the gesture reception periods T with regard to the respective directions.

Figure 16:
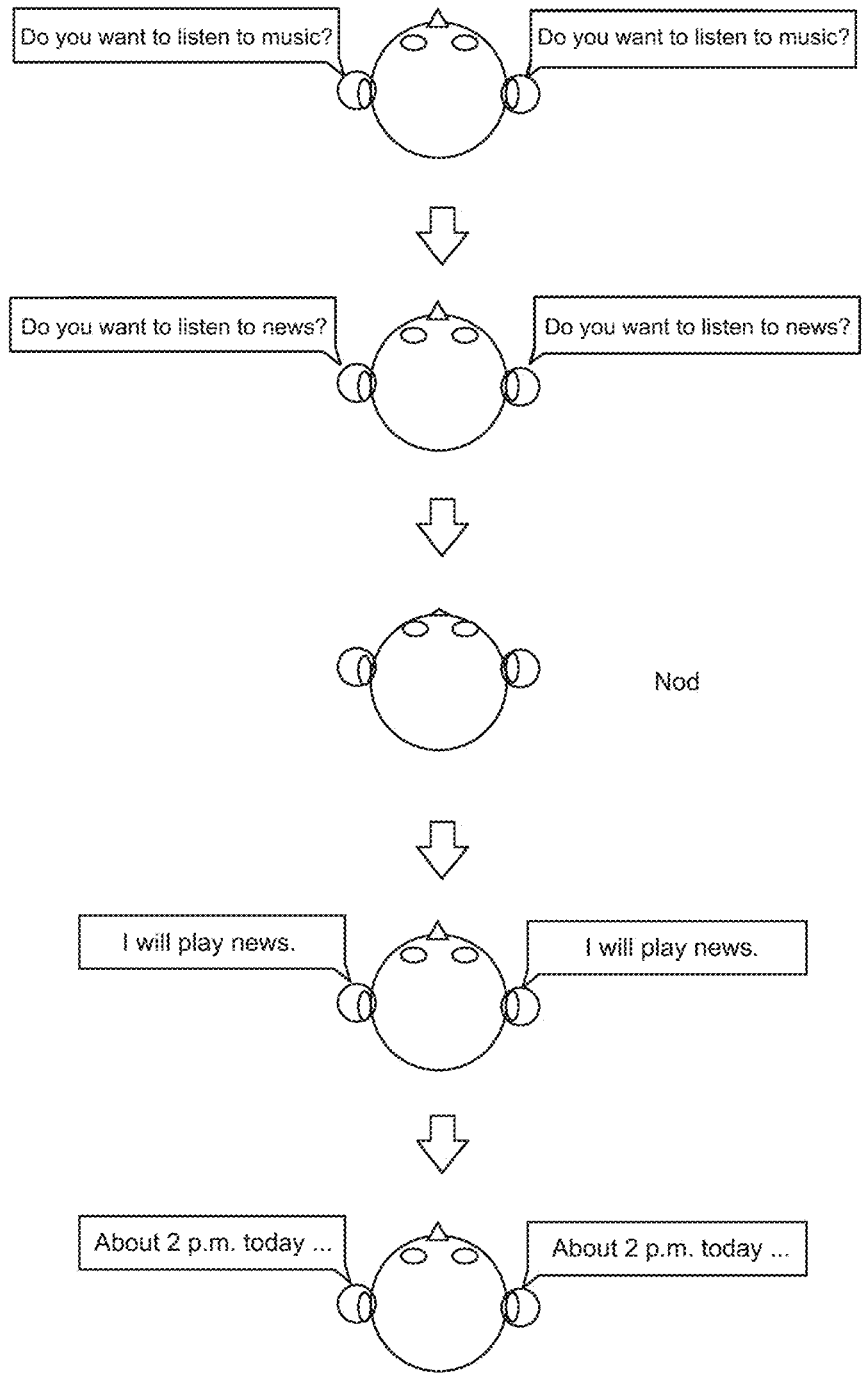
FIG. 16 is a diagram illustrating presentation of items in a menu according to a comparative example.

Here, as a comparative example that is compared against the present embodiment, it is assumed that a menu is audibly presented to the user in such a manner that the respective items are not separated by directions but the respective items are separated only by time. FIG. 16 is a diagram illustrating presentation of items in a menu according to the comparative example.

According to the comparative example illustrated in FIG. 16, it is assumed that voices corresponding to items such as the voice saying "do you want to listen to music?", the voice saying "do you want to listen to news?", the voice saying "do you want to listen to a message?", or the voice saying "do you want to listen to your schedule?" are output in this order with regard to the respective items. Note that, according to the comparative example, the voices corresponding to items are output from both the right direction and the left direction unlike the present embodiment.

After output of the voice saying "do you want to listen to news?", the user makes a nodding gesture in response to the voice. This makes it possible to select the item related to "news". Next, the voice saying "I will play news" is output (from both the left and right directions), and then a voice reading out the news is output (from both the left and right directions).

In the comparative example, the gesture reception period T is set for each of the items in a way similar to the present embodiment. However, in the comparative example, the gesture reception period T is not set for each direction unlike the present embodiment. For example, the gesture reception period T corresponding to the item related to "music" is a period from start of output of the voice saying "do you want to listen to music?" to start of output of the voice saying "do you want to listen to news?". In addition, the gesture reception period T corresponding to the item related to "news" is a period from start of output of the voice saying "do you want to listen to news?" to start of output of the voice saying "do you want to listen to a message?".

The comparative example has a problem that it is impossible to output the voices corresponding to the items quickly and successively. This is because the user needs some time to respond to the voice, and a gesture of the user cannot catch up with a voice if voices corresponding to the items are output quickly and successively. For example, even when the user nods in response to the voice saying "do you want to listen to news?", the item related to "message" may be selected without the user's intension because output of the voice saying "do you want to listen to a message?" has already been started.

Therefore, in the comparative example, it is necessary to output the voice saying "do you want to listen to a message?" at a predetermined interval (a period of time spared in view of user response time) after output of the voice saying "do you want to listen to news?", for example. Therefore, it is impossible to output the voices corresponding to the items quickly and successively. In addition, the comparative example also has a problem that it takes a long time to present all the items included in a menu to the user because it is impossible to output the voices corresponding to the items quickly and successively.

On the other hand, according to the present embodiment, it is possible to output the voices corresponding to the items quickly and successively. This is because, according to the present embodiment, the first gesture reception period T is a period from start of output of a voice from the right direction to start of output of a next voice from the right direction, and the second gesture reception period T is a period from start of output of a voice from the left direction to start of output of a next voice from the left direction.

With reference to FIG. 7, for example, it is assumed that the voice saying "do you want to listen to news?" is output from the left direction, and the user turns to the left direction in response to the voice. According to the present embodiment, the voice saying "do you want to listen to a message?" is output immediately after the voice saying "do you want to listen to news?". Therefore, sometimes output of the voice saying "do you want to listen to a message?" has already been started when the user has turned to the left direction.

However, the gesture reception period T regarding "news" includes the voice output period t of the voice saying "do you want to listen to a message?". Therefore, it is possible to select the item related to "news" even if output of the voice saying "do you want to listen to a message?" has already been started when the user has turned to the left direction.

As described above, according to the present embodiment, it is possible for the user to appropriately select his/her desired item even if the voices corresponding to the items are output quickly and successively. In addition, according to the present embodiment, it is possible to output the voices corresponding to the items quickly and successively. Therefore, the present embodiment also has the advantage of being capable of shortening time it takes to present all the items included in a menu to the user.

In addition, according to the present embodiment, the lengths of the voice output periods t are adjusted in such a manner that the gesture reception periods T regarding the respective items corresponding to the voices have constant lengths (see Step 309 to Step 313). This makes it possible to present the voices corresponding to the items to the user in good tempo and in a uniform rhythm.

In addition, according to the present embodiment, the text data serving as a source of a voice changes in the case where the length of the voice output period t does not fall within a predetermined range (from the upper limit value Th1 to the lower limit value Th2). Alternatively, reproduction speed of the voice is adjusted in the case where the length of the voice output period t does not fall within a predetermined range (from the upper limit value Th1 to the lower limit value Th2). This makes it possible to appropriately adjust the length of the voice output period t.

Note that, when the length of the voice output period t is too long, the long voice is output and this gives a sense of dissatisfaction to the user. However, according to the present embodiment, the length of the voice output period t is shortened in the case where the voice output period t is long. This makes it possible to prevent the user from feeling the sense of dissatisfaction. On the other hand, when the length of the voice output period t is too short, the gesture reception period T is also short. However, according to the present embodiment, a space is added. This makes it possible to prevent the gesture reception period T from being shortened.

In addition, according to the present embodiment, the length of the gesture reception period T are controlled in such a manner that the gesture reception period T has a variable length (see Step 327 to Step 330). In particular, according to the present embodiment, the gesture reception period T is controlled in such a manner that the gesture reception period T has a variable length in the case where the user performs the vague behavior that is not determined as the item selection gesture (in response to behavior of the user).

This makes it possible to appropriately change the length of the gesture reception period T. In addition, according to the present embodiment, the length of the gesture reception period T is controlled in such a manner that the gesture reception period T has a variable length, by controlling the length of the extension period to be added after the voice output period t in such a manner that the extension period has a variable length. By adjusting the length of the extension period, it is possible to appropriately adjust the length of the gesture reception period T.

Here, by way of comparison with regard to reproduction of music, it is also assumed that the user says "play (music title)", this voice of the user is analyzed, and then a music track corresponding to the music title is reproduced, for example. However, it is necessary for the user to exactly remember the music title of the music track that he/she wants to reproduce, to reproduce the music track by designating the music track as described above. On the other hand, in the case where the items are presented by voice such as a voice saying "do you want to listen to a (music title)?", or a voice saying "do you want to listen to b (music title)?", it is possible for the user to select and reproduce his/her desired music track even if the user does not remember the exact music title.

In a similar way, with regard to reproduction of news, it is also assumed that the user says "play (news title)", this voice of the user is analyzed, and then a news topic corresponding to the news title is read out. On the other hand, sometimes the user does not know what kinds of news have happened. In addition, even if the user knows what kinds of news have happened, the user hardly knows exact news titles corresponding to the news. On the other hand, in the case where the items are presented by voice such as a voice saying "do you want to listen to A (news title)?", or a voice saying "do you want to listen to B (news title)?", it is possible for the user to select and reproduce his/her desired news topic even if the user does not know its exact news title.

In other words, the method of audibly presenting items and selecting an item by a gesture (method according to the present technology) is disadvantageous in that it takes more time to select the item than the case where the user pinpoints the item by voice, but the method according to the present technology is advantageous in that it is possible to select an item even if the user does not know the name or title related to the item to be selected.

Note that, this does not exclude a combination of the method of audibly presenting items and selecting an item by a gesture (method according to the present technology) and the method of pinpointing and designating an item by voice. In other words, it is also possible to combine the method according to the present technology and the method of pinpointing and designating an item by voice. In this case, a microphone is installed in the headphones 10 or the microphone 17 of the smartphone 20 is used for acquiring a voice of a user, In this case, for example, the user pinpoints and designates an item by voice when the user remembers the exact name or title of the item (such as a music title or a news title). Alternatively, the item may be selected by using the method according to the present technology when the user does not know the exact name or title of the item.

In addition, in the case where multiple menus are layered, a menu in a higher layer may be skipped by pinpointing and designating an item by voice. For example, with reference to FIG. 9, in the case where the user has said "music of singer A (singer name)", the main menu (first layer) and the singer search menu (second layer) are skipped, and presentation of the album search menu (third layer) starts.

Second Embodiment

Next, a second embodiment of the present technology will be described. In the description related to the second embodiment, structures and functions that are similar to those in the first embodiment will be denoted by the same reference signs as the first embodiment, and description thereof will be omitted or simplified.

Figure 17:
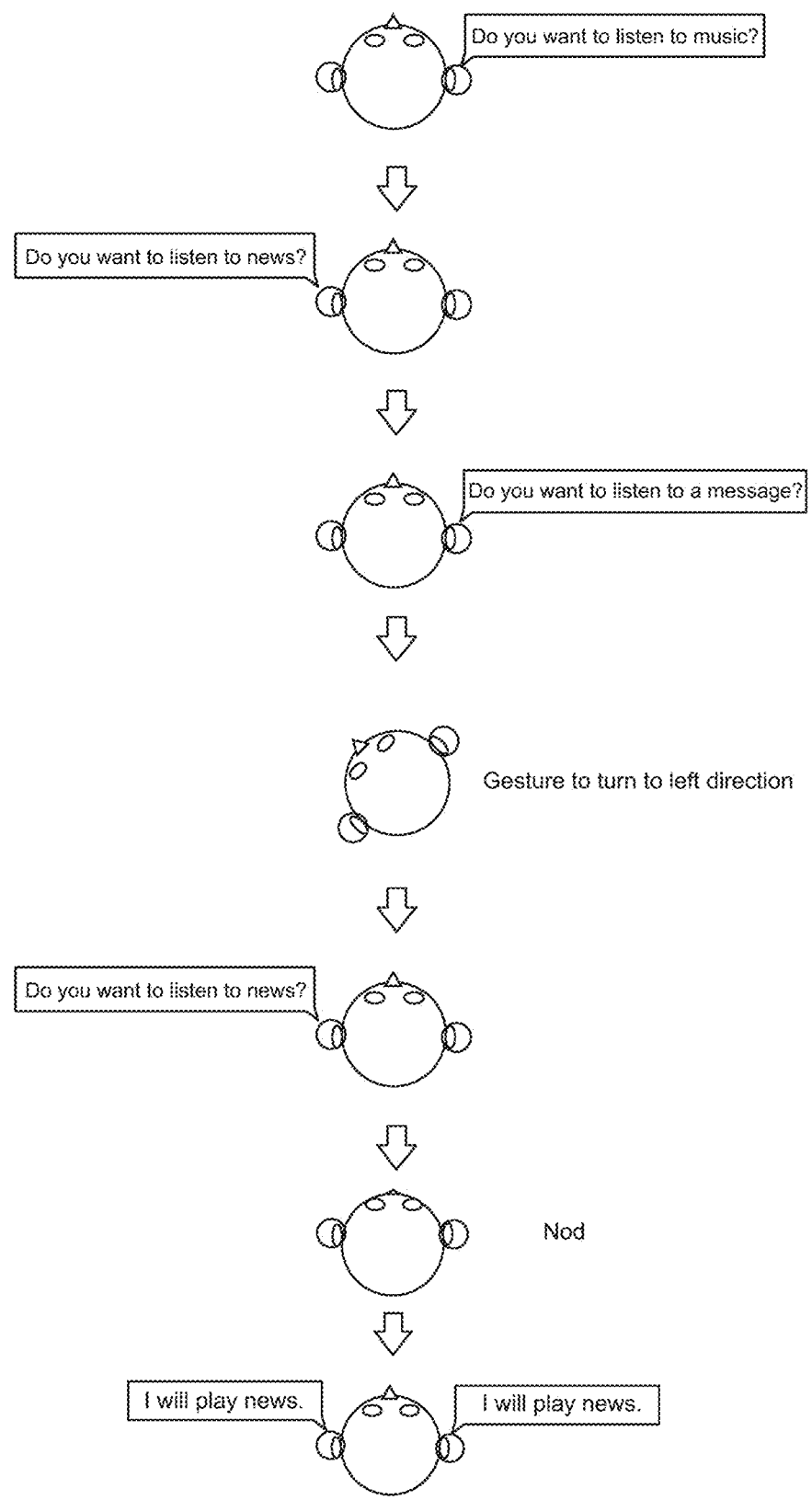
FIG. 17 is a diagram illustrating an item selection method according to a second embodiment.

The second embodiment is different from the above-described first embodiment in item selection method, and such a difference will be mainly described hereinafter. FIG. 17 is a diagram illustrating the item selection method according to the second embodiment.

As illustrated in FIG. 17, voices corresponding to items such as the voice saying "do you want to listen to music?", the voice saying "do you want to listen to news?", the voice saying "do you want to listen to a message?", and the voice saying "do you want to listen to your schedule?" are output alternately from the right direction and the left direction with regard to the respective items. It is assumed that the user makes a gesture of turning to the left direction in response to the voice saying "do you want to listen to news?" during the gesture reception period T2 corresponding to the item related to "news" (see FIG. 7).

According to the first embodiment described above, the item related to "news" is selected and reproduction of news starts (or a menu in a lower layer than the layer of the news is referred) in such a case. However, according to the second embodiment, the item related to "news" has not been selected yet at this time.

According to the second embodiment, the voice saying "do you want to listen to news?" is output again from the left direction in the case where the user makes the gesture of turning to the left direction during the gesture reception period T2 corresponding to the item related to "news".

Note that, in the case where the user makes the gesture of turning to the left direction while the voice saying "do you want to listen to news?" is being output for the first time, the voice saying "do you want to listen to news?" is output for the second time after the output of the voice saying "do you want to listen to news?" is completed for the first time (or after the output of the voice is paused). In this case, the voice saying "do you want to listen to news?" is repeatedly output twice.

In addition, in the case where the user makes the gesture of turning to the left direction while the voice saying "do you want to listen to a message?" is being output, the voice saying "do you want to listen to news?" is output for the second time after the output of the voice saying "do you want to listen to a message?" is completed (or after the output of the voice is paused). In this case, the processing returns to the question (item) asking "do you want to listen to news?" before the question asking "do you want to listen to a message?".

The item related to "news" is selected when the user makes a nodding gesture (which is a gesture different from a gesture of returning to a previous item) during the gesture reception period T regarding the second voice saying "do you want to listen to news?" (such as a period obtained by adding the voice output period t and the extension period or the like. This is independent of the voice output directions and not illustrated in FIG. 7).

Note that, in the case where the user has not made the nodding gesture in response to the second voice saying "do you want to listen to news?", the voice saying "do you want to listen to a message?" is subsequently output again from the right direction.

In this example, the case where the processing returns to the voice corresponding to the previous item in response to the gesture (alternatively, the voice corresponding to the same time is repeated) has been described. On the other hand, it is also possible to proceed to a voice corresponding to a subsequent item in response to a gesture.

For example, it is assumed that the user makes the gesture of turning to the left direction during the gesture reception period T2 corresponding to the item related to "news" (see FIG. 7). In this case, a voice is skipped and the process proceeds to the question asking "do you want to listen to your schedule?" (next voice from the left direction).

Note that, in the case where the user makes the gesture of turning to the left direction while the voice saying "do you want to listen to news?" is being output, the voice saying "do you want to listen to your schedule?" is output after the output of the voice saying "do you want to listen to news?" is completed (or after the output of the voice is paused). In this case, the entire voice saying "do you want to listen to a message?" is skipped.

In addition, in the case where the user makes the gesture of turning to the left direction while the voice saying "do you want to listen to a message?" is being output, the voice saying "do you want to listen to a message?" is paused and the voice saying "do you want to listen to your schedule?" is output.

The item related to "schedule" is selected when the user makes the nodding gesture (which is a gesture different from a gesture of proceeding to a subsequent item) during the gesture reception period T regarding the voice saying "do you want to listen to your schedule?" (such as a period obtained by adding the voice output period t and the extension period or the like. This is independent of the voice output directions and not illustrated in FIG. 7).

Note that, in the case where the nodding gesture is not made in response to the voice saying "do you want to listen to your schedule?", the voice saying "do you want to call on the phone?" is subsequently output from the right direction.

In the example in which the processing returns to the voice corresponding to the previous item, it is possible for the user to select the item slowly without any panic. On the other hand, in the example in which the processing proceeds to the voice corresponding to the subsequent item, it is possible for the user to quickly select the subsequent item. For example, such a method is effective in the case where the user knows the order of the items in the menu and the user wants to select an item in the second half of the menu.

Various Modifications

[Voice Output Direction Relative to User, Etc.]

The case where the voice is output to the user from the right direction and the left direction has been described above. However, the directions of outputting the voice to the user (sound image localization positions) may be an upper direction, a lower direction, or the like. The directions are not specifically limited as long as the directions are different from each other.

In the case where the voice output direction is the upper direction or the lower direction, an item corresponding to a voice output from above is selected when the user quickly turns to the upper direction. In addition, an item corresponding to a voice output from below is selected when the user quickly turns to the lower direction.

The case where the voices are output from the two directions has been described above. However, it is also possible to output voices from three or more directions (in this case, the gesture reception period T is set for each of the three or more directions).

It is also possible to move a direction (sound image localization position) of outputting a voice to the user while the voice is being output. For example, a sound image of the voice saying "do you want to listen to music?" is initially located in front of the user, but the sound image gradually moves to the right side of the user while the voice is being output. In addition, for example, a sound image of the voice saying "do you want to listen to news?" is initially located in front of the user, but the sound image gradually moves to the left side of the user while the voice is being output.

In addition, it is also possible to present voices in different tones (voices of a same person in different tone, voices of different people (such as a male voice and a female voice) in accordance with respective directions.

The direction of outputting the voice to the user may be controlled in such a manner that the direction is variable. This makes it possible to appropriately change the voice output direction.

In this case, the voice output direction may be controlled in such a manner that the voice output direction is variable in accordance with the orientation of the face of the user. For example, it is assumed that reproduction of a menu starts when the body of the user faces a front side but the face of the user faces the right direction. In this case, voices are output to the user alternately from the front direction and the left direction with regard to respective items. Note that, the imaging section may be installed in the headphone units 1 or the smartphone 20 to determine the orientation of the face relative to the orientation of the body of the user.

In this case, an item corresponding to a voice output from the front side is selected when the user quickly turns to the front direction. On the other hand, when the user quickly turns to the left direction, an item corresponding to a voice output from the left direction is selected.

When the user slowly turns to the front side (behavior that is not determined to be the item selection gesture), the voice output direction changes. In this case, voices are output to the user alternately from the right direction and the left direction with regard to respective items (this has already been described in the first embodiment). When the voice output direction has changed, it is also possible to vocally notify the user that the voice output direction has been changed.

Alternatively, when the user slowly turns to the left direction (behavior that is not determined to be the item selection gesture), the voice output direction changes. In this case, voices are output to the user alternately from the front direction and the right direction with regard to respective items.

In this case, an item corresponding to a voice output from the front side is selected when the user quickly turns to the front direction. On the other hand, when the user quickly turns to the right direction, an item corresponding to a voice output from the right direction is selected.

In the case where the menu includes multiple menus in different layers, the direction of outputting the voice to the user may be controlled in such a manner that the direction is variable in accordance with the layers of the menus. For example, with reference to FIG. 8, it is assumed that a voice output direction related the main menu is set to the right direction or the left direction, and a voice output direction related to the submenus is set to the upper direction or the lower direction. As described above, it is possible for the user to easily and intuitively recognize change of the layer of the menu when the voice output directions are switched in accordance with the layers.

[Gesture Reception Period T, Etc.]

In the above description, the gesture reception period T is a period from start of output of a voice from a specific direction to start of output of a next voice from the same direction. However, the gesture reception period T may also be a period from start of output of a voice to start of output of a next voice (regardless of their directions). For example, with reference to FIG. 7, a gesture reception period T corresponding to the item related to "news" may be a period from start of output of a voice saying "do you want to listen to news?" to start of output of a voice saying "do you want to listen to a message?".

In the above description, the gesture reception period T is extended by time corresponding to the extension period in the case where a vague behavior is performed. The vague behavior is not determined to be the item selection gesture. However, it is also possible to extend the gesture reception period T by the time corresponding to the extension period in the case where the still head of the user moves even a little (in response to behavior of the user). In this case, the extension period may get longer as the head of the user moves more. In addition, the extension period may end when the head of the user stops moving. Note that, it is possible to determine the movement of the head of the user and magnitude of the movement on the basis of detection values obtained by the motion sensors 7.

In addition, it is also possible to extend the gesture reception period T by the time corresponding to the extension period in the case where the user is doing exercise (such as walking or running) (in response to behavior of the user). In this case, the extension period gets longer as the user moves more intensely. Note that, it is possible to determine whether the user is doing exercise, and determine the intensity of the exercise on the basis of detection values obtained by the motion sensors 7.

In addition, it is also possible to extend the gesture reception period T by the time corresponding to the extension period in accordance with user response speed regarding an item selection gesture that is made in response to a voice. In this case, the extension period gets longer as mean time from start of output of the voice to detection of the item selection gesture increases.

In addition, it is also possible to extend the gesture reception period T by the time corresponding to the extension period in accordance with importance of items in a menu. In this case, the extension period gets longer as the importance of an item increases. For example, the extension period is extended when there are to options, which are YES (right) and NO (left), in response to a vocal question.

In addition, it is also possible to extend the gesture reception period T by the time corresponding to the extension period in accordance with the length of the text data serving as a source of a voice, or in accordance with the difficulties of words included in the text data. In this case, the extension period gets longer as the text data has a longer length, and the text data also gets longer as the difficulties of words included in the text data gets harder. Note that, according to the first embodiment described above, the length of the text data is adjusted in such a manner that the text data has an appropriate length in the case where the text data is too long. Therefore, the text data does not have too long length in general. However, sometimes the text data has a long length in the case where such processing is not executed.

Under a predetermined condition, the extension period may be shortened (or omitted). For example, the extension period may be shortened (or omitted) in accordance with the number of items included in a menu or in accordance with the number of layers of menus. In this case, the extension period is shortened (or omitted) more as the number of items included in a menu or the number of layers of menus increases.

In addition, for example, the extension period may be shortened (or omitted) in accordance with time slots. For example, in a busy time period such as morning, the extension period is shortened (or omitted) more than the other time slots.

Reproduction speed of a voice may change in the case where the user performs the vague behavior or the user is doing exercise. For example, the reproduction speed of the voice slows down in the case where the user has performed the vague behavior. In addition, for example, the reproduction speed of the voice speeds up in the case where the number of items included in a menu or the number of layers of menus is large.

[Voice Output Period t, Item Selection Gesture, Etc.]

The voice output period t regarding a voice output from the right direction may partially overlap a voice output period t regarding a voice output from the left direction. For example, output of the voice saying "do you want to listen to news?" from the left direction may start before output of the voice saying "do you want to go to music?" from the right direction ends. Such a method is effective in the case where the text data is long, in the case where a menu includes many items, in the case where the number of layers of menus is large, or the like, for example.

It is also possible to learn the item selection gestures through a learning function, and the thresholds for detecting the item selection gestures may change. It is also possible to determine whether an item has been selected by combining detection of the item selection gestures and gaze detection (in this case, a gaze detection device is installed in the information processing apparatus 100).

In addition, on the basis of responses made by the user with regard to voices corresponding to several items in the beginning of a menu while the menu is being presented to the user, it is also possible to predict a response from the user to remaining items. It is also possible to change the items in the menu or the order of the items on the basis of a response from the user to a voice while the menu is being presented to the user.

For example, it is assumed that the user performs a vague behavior when the voice saying "do you want to listen to b (music title)?" is being output, with regard to the voice saying "do you want to listen to a (music title)?" and the voice saying "do you want to listen to b (music title)?" with regard to the music search menu. In this case, items in the menu are changed in such a manner that a music track that is similar to the music track b is read out preferentially. At this time, it is possible to use information indicating the degree of vagueness of the behavior of the user.

[Information Processing Apparatus, Etc.]

In the above description, the control sections of the headphone units 1 perform the processing related to detection of gestures and the like, and the control section 12 of the smartphone 20 performs the processing related to the text data and the gesture reception period T, and the like. However, it is possible to appropriately change the allocation of various kinds of processing. For example, it is also possible for the control sections of the headphone units 1 to perform the processing related to the text data and the gesture reception period T, and it is also possible for the control section 12 of the smartphone to perform the processing related to detection of gestures.

In addition, it is also possible for the control sections of the headphone units 1 to perform all of the various kinds of processing described above. Alternatively, it is also possible for the control section 12 of the smartphone 20 to perform all of the various kinds of processing. Alternatively, it is also possible for a server apparatus on a network to perform the various kinds of processing.

In the above description, the headphones 10 includes the two separate headphone units 1. However, for example, the headphones 10 may be integrated headphones 10 including two headphone units 1 that are connected via a band.

In the above description, the information processing apparatus 100 includes the headphones 10 and the smartphone 20. However, the information processing apparatus 100 may include the headphones 10 only. In this case, the functions of the smartphone 20 should be incorporated into the headphones 10. Alternatively, the information processing apparatus 100 may include the smartphone 20 only.

In addition, the information processing apparatus 100 may be a stationary apparatus such as a stationary speaker or a desktop personal computer (PC), or may be a portable apparatus such as a tablet PC, a laptop PC, a portable music player, a portable game console, or a mobile phone (other than the smartphone 20). Alternatively, for example, the information processing apparatus 100 may be a wearable apparatus such as a head-mounted display or a glasses-type smartglasses.

In addition, the information processing apparatus 100 may include multiple stationary speakers that are placed in a spatially distributed manner (for example, such speakers present items to a user stereophonically), and a stationary camera for detecting gestures of the user.

The present technology may also be configured as below.

(1) An information processing apparatus including
a control section that controls output of voices corresponding to respective items in such a manner that the voices corresponding to the respective items are output to a user alternately from a first direction and a second direction, executes processing related to selection of an item corresponding to a voice output from the first direction in response to a gesture of the user in the first direction, and executes processing related to selection of an item corresponding to a voice output from the second direction in response to a gesture of the user in the second direction.

(2) The information processing apparatus according to (1),
in which the control section sets a gesture reception period of receiving a gesture of the user, for each of the items corresponding to the voices.

(3) The information processing apparatus according to (2),
in which, as the gesture reception periods, the control section sets a first gesture reception period of selecting the item corresponding to the voice output from the first direction and a second gesture reception period of selecting the item corresponding to the voice output from the second direction.

(4) The information processing apparatus according to (3),
in which the first gesture reception period is a period from start of output of the voice from the first direction to start of output of a next voice from the first direction.

(5) The information processing apparatus according to (4),
in which the second gesture reception period is a period from start of output of the voice from the second direction to start of output of a next voice from the second direction.

(6) The information processing apparatus according to any one of (2) to (5)
in which the gesture reception period includes at least a voice output period that is a period from start to stop of output of the voice.

(7) The information processing apparatus according to (6),
in which the control section adjusts length of the voice output period in such a manner that the gesture reception periods regarding the respective items corresponding to the voices have constant lengths.

(8) The information processing apparatus according to (7),
in which the control section adjusts the length of the voice output period in such a manner that the length of the sound output period falls within a predetermined range.

(9) The information processing apparatus according to (8),
in which the control section changes text data serving as a source of the voice in the case where the length of the voice output period does not fall within the predetermined range.

(10) The information processing apparatus according to (8) or (9),
in which the control section changes reproduction speed of the voice in the case where the length of the voice output period does not fall within the predetermined range.

(11) The information processing apparatus according to any one of (2) to (10),
in which the control section controls length of the gesture reception period in such a manner that the gesture reception period has a variable length.

(12) The information processing apparatus according to (11),
in which the control section controls the length of the gesture reception period in such a manner that the gesture reception period has a variable length in accordance with behavior of the user.

(13) The information processing apparatus according to (11) or (12), in which
the gesture reception period includes at least a voice output period that is a period from start to stop of output of the voice and an extension period added after the voice output period, and
the control section controls length of the extension period in such a manner that the extension period has a variable length, and thereby controls the length of the gesture reception period in such a manner that the gesture reception period has a variable length.

(14) The information processing apparatus according to any one of (1) to (13),
in which the control section controls the first direction and the second direction in such a manner that the first direction and the second direction are variable.

(15) The information processing apparatus according to (14),
in which the control section controls the first direction and the second direction in such a manner that the first direction and the second direction are variable in accordance with an orientation of the user.

(16) The information processing apparatus according to (14) or (15), in which
the item is an item in a menu,
the menu includes multiple menus in the different layers, and
the control section controls the first direction and the second direction in such a manner that the first direction and the second direction are variable in accordance with the layers of the menus.

(17) The information processing apparatus according to any one of (1) to (16),
in which the information processing apparatus includes an apparatus worn in or on an ear of the user.

(18) The information processing apparatus according to (17), in which
the first direction is a right direction,
the second direction is a left direction, the gesture of the user in the first direction is a user gesture of turning to the right direction, and the gesture of the user in the second direction is a user gesture of turning to the left direction.

(19) An information processing method including:

controlling output of voices corresponding to respective items in such a manner that the voices corresponding to the respective items are output to a user alternately from a first direction and a second direction;

executing processing related to selection of an item corresponding to a voice output from the first direction in response to a gesture of the user in the first direction; and executing processing related to selection of an item corresponding to a voice output from the second direction in response to a gesture of the user in the second direction.

(20) A program that causes a computer to function as a control section that:

controls output of voices corresponding to respective items in such a manner that the voices corresponding to the respective items are output to a user alternately from a first direction and a second direction;

executes processing related to selection of an item corresponding to a voice output from the first direction in response to a gesture of the user in the first direction; and executes processing related to selection of an item corresponding to a voice output from the second direction in response to a gesture of the user in the second direction.

REFERENCE SIGNS LIST 1a first headphone unit
1b second headphone unit
4a control section of first headphone unit
4b control section of second headphone unit
10 headphones
12 control section of smartphone
20 smartphone
100 information processing apparatus

The invention claimed is:

1. An information processing apparatus, comprising:
a control section configured to
control output of voices corresponding to respective items in such a manner that the voices corresponding to the respective items are output to a user alternately at predetermined timings from a first direction and a second direction,
execute processing related to selection of an item corresponding to a voice output from the first direction in response to a gesture of the user in the first direction within a first gesture reception period determined based on the predetermined timing of the voice output from the first direction, and
execute processing related to selection of an item corresponding to a voice output from the second direction in response to a gesture of the user in the second direction within a second gesture reception period determined based on the predetermined timing of the voice output from the second direction,
wherein the first gesture reception period and the second gesture reception period are each further determined based on behavior of the user, and
wherein the control section is implemented via at least one processor.

2. The information processing apparatus according to claim 1, wherein the control section is further configured to set a respective gesture reception period of receiving a gesture of the user, for each respective item of the items corresponding to the voices.

3. The information processing apparatus according to claim 2, wherein as the respective gesture reception period for each respective item, the control section sets the first gesture reception period of selecting the item corresponding to the voice output from the first direction and the second gesture reception period of selecting the item corresponding to the voice output from the second direction.

4. The information processing apparatus according to claim 3, wherein the first gesture reception period is a period from start of output of the voice from the first direction to start of output of a next voice from the first direction.

5. The information processing apparatus according to claim 4, wherein the second gesture reception period is a period from start of output of the voice from the second direction to start of output of a next voice from the second direction.

6. The information processing apparatus according to claim 2, wherein each gesture reception period includes at least a voice output period that is a period from start to stop of output of the voice.

7. The information processing apparatus according to claim 6, wherein the control section adjusts length of the voice output period in such a manner that the gesture reception periods regarding the respective items corresponding to the voices have constant lengths.

8. The information processing apparatus according to claim 7, wherein the control section adjusts the length of the voice output period in such a manner that the length of the voice output period falls within a predetermined range.

9. The information processing apparatus according to claim 8, wherein the control section changes text data serving as a source of the voice in a case where the length of the voice output period does not fall within the predetermined range.

10. The information processing apparatus according to claim 8, wherein the control section changes reproduction speed of the voice in a case where the length of the voice output period does not fall within the predetermined range.

11. The information processing apparatus according to claim 2, wherein the control section controls length of each gesture reception period in such a manner that the gesture reception period has a variable length.

12. The information processing apparatus according to claim 11, wherein the control section controls the length of the gesture reception period in such a manner that each gesture reception period has the variable length in accordance with the behavior of a head of the user.

13. The information processing apparatus according to claim 11, wherein each gesture reception period includes at least a voice output period that is a period from start to stop of output of the voice and an extension period added after the voice output period, and the control section controls length of the extension period in such a manner that the extension period has a variable length, and thereby controls the length of each gesture reception period in such a manner that the gesture reception period has the variable length.

14. The information processing apparatus according to claim 1, wherein
the control section controls the first direction and the second direction in such a manner that the first direction and the second direction are variable.

15. The information processing apparatus according to claim 14, wherein
the control section controls the first direction and the second direction in such a manner that the first direction and the second direction are variable in accordance with an orientation of the user.

16. The information processing apparatus according to claim 14, wherein
the item is an item in a menu,
the menu includes multiple menus in the different layers, and
the control section controls the first direction and the second direction in such a manner that the first direction and the second direction are variable in accordance with the layers of the menus.

17. The information processing apparatus according to claim 1, wherein
the information processing apparatus includes an apparatus worn in or on an ear of the user.

18. The information processing apparatus according to claim 17, wherein
the first direction is a right direction,
the second direction is a left direction,
the gesture of the user in the first direction is a user gesture of turning to the right direction, and
the gesture of the user in the second direction is a user gesture of turning to the left direction.

19. The information processing apparatus according to claim 1, wherein
the behavior of the user includes at least one of a speed or an angle of a body part of the user.

20. An information processing method, comprising:
controlling output of voices corresponding to respective items in such a manner that the voices corresponding to the respective items are output to a user alternately at predetermined timings from a first direction and a second direction;
executing processing related to selection of an item corresponding to a voice output from the first direction in response to a gesture of the user in the first direction within a first gesture reception period determined based on the predetermined timing of the voice output from the first direction; and
executing processing related to selection of an item corresponding to a voice output from the second direction in response to a gesture of the user in the second direction within a second gesture reception period determined based on the predetermined timing of the voice output from the second direction;
wherein the first gesture reception period and the second gesture reception period are each further determined based on behavior of the user.

21. A non-transitory computer-readable storage medium having embodied thereon a program, which when executed by a computer causes the computer to execute a method, the method comprising:
controlling output of voices corresponding to respective items in such a manner that the voices corresponding to the respective items are output to a user alternately at predetermined timings from a first direction and a second direction;
executing processing related to selection of an item corresponding to a voice output from the first direction in response to a gesture of the user in the first direction within a first gesture reception period determined based on the predetermined timing of the voice output from the first direction; and
executing processing related to selection of an item corresponding to a voice output from the second direction in response to a gesture of the user in the second direction within a second gesture reception period determined based on the predetermined timing of the voice output from the second direction;
wherein the first gesture reception period and the second gesture reception period are each further determined based on behavior of the user.

* * * * *